(12) United States Patent
Li et al.

(10) Patent No.: US 11,168,757 B2
(45) Date of Patent: Nov. 9, 2021

(54) APPARATUS AND METHODS FOR NON-CONTACT DAMPING OF OPTICAL FIBER VIBRATION

(71) Applicant: CORNING INCORPORATED, Corning, NY (US)

(72) Inventors: Yuehao Li, Painted Post, NY (US); Derwin A Nelson, Corning, NY (US); Yousef Kayed Qaroush, Painted Post, NY (US); Yang Yang, Windsor Mill, MD (US)

(73) Assignee: Corning Incorporated, Corning, NY (US)

( * ) Notice: Subject to any disclaimer, the term of this patent is extended or adjusted under 35 U.S.C. 154(b) by 225 days.

(21) Appl. No.: 16/552,086

(22) Filed: Aug. 27, 2019

(65) Prior Publication Data

US 2020/0072311 A1 Mar. 5, 2020

Related U.S. Application Data

(60) Provisional application No. 62/723,662, filed on Aug. 28, 2018.

(51) Int. Cl.
*G01H 9/00* (2006.01)
*F16F 7/14* (2006.01)
*G02B 6/44* (2006.01)

(52) U.S. Cl.
CPC ............. *F16F 7/14* (2013.01); *G01H 9/006* (2013.01); *G02B 6/4401* (2013.01); *B41J 2202/02* (2013.01)

(58) Field of Classification Search
None
See application file for complete search history.

(56) References Cited

U.S. PATENT DOCUMENTS 4,629,285 A   12/1986   Carter et al.
4,881,489 A   11/1989   Klebl et al.
(Continued)

FOREIGN PATENT DOCUMENTS

CN   205080288 U   3/2016
CN   103273312 B   4/2016
(Continued)

OTHER PUBLICATIONS

Sharma et al.; "A Review of the Development in the Field of Fiber Optic Communication Systems." International Journal of Emerging Technology and Advanced Engineering Journal 3, No. 5; (2013); pp. 113-119.
(Continued)

*Primary Examiner* — Chad H Smith
(74) *Attorney, Agent, or Firm* — Kevin L. Bray

(57) ABSTRACT

The apparatus for non-contact damping vibration of a vibrating optical fiber moving over an optical fiber path includes an air bearing and an air supply. The air bearing includes a body having an aperture defined by an inner surface and a central axis that passes through the center of the aperture and along which lies the optical fiber path. A plurality of nozzles is distributed around the inner surface and directed toward the central axis. An air conduit within the body is in pneumatic communication with the plurality of nozzles. The air supply is pneumatically connected to the air conduit and is configured to supply pressurized air to the air bearing. The pressurized air is directed through the nozzles to the vibrating optical fiber and impinges on the optical fiber to damp the vibration of the vibrating optical fiber.

17 Claims, 18 Drawing Sheets

(56) References Cited

U.S. PATENT DOCUMENTS

| | | | |
|---|---|---|---|
| 5,042,899 A | | 8/1991 | Le Compte |
| 5,119,464 A | | 6/1992 | Claude et al. |
| 5,377,292 A | * | 12/1994 | Bartling ............... G02B 6/4482 118/405 |
| 5,796,905 A | | 8/1998 | Hoffart et al. |
| 6,360,044 B1 | | 3/2002 | Mills et al. |
| 6,404,972 B1 | | 6/2002 | Pasch et al. |
| 6,576,591 B1 | | 6/2003 | Snowdon et al. |
| 6,650,815 B2 | | 11/2003 | Hawtof et al. |
| 7,072,554 B2 | | 7/2006 | Watanabe et al. |
| 7,926,304 B2 | * | 4/2011 | Costello, III ....... C03B 37/0253 65/379 |
| 7,937,971 B2 | * | 5/2011 | Costello, III ..... C03B 37/02718 65/435 |
| 8,573,008 B2 | | 11/2013 | Faler et al. |
| 8,768,128 B1 | | 7/2014 | Garner et al. |
| 8,973,408 B2 | * | 3/2015 | Filippov ........... C03B 37/02718 65/435 |
| 2001/0048797 A1 | | 12/2001 | Van et al. |
| 2009/0139270 A1 | | 6/2009 | Filippov et al. |
| 2011/0289979 A1 | * | 12/2011 | Faler ................ C03B 37/02718 65/424 |
| 2014/0205251 A1 | * | 7/2014 | Garner ............... G02B 6/02395 385/123 |
| 2015/0192748 A1 | | 7/2015 | Sato et al. |
| 2015/0352861 A1 | | 12/2015 | Yagi et al. |
| 2019/0219783 A1 | | 7/2019 | Ly et al. |
| 2020/0064550 A1 | | 2/2020 | Sato et al. |
| 2020/0072311 A1 | | 3/2020 | Li et al. |

FOREIGN PATENT DOCUMENTS

| | | |
|---|---|---|
| DE | 3208172 A1 | 9/1983 |
| FR | 2509275 A1 | 1/1983 |
| JP | 63195610 A | 8/1988 |
| JP | 11326714 A | 11/1999 |
| JP | 2000159536 A | 6/2000 |
| JP | 2000247688 A | 9/2000 |
| JP | 2004157193 A | 6/2004 |
| JP | 2016206211 A | 12/2016 |

OTHER PUBLICATIONS

Westwind Air Bearing Spindles; "Air Bearing Technology."; Celera Motion; 2 pages; 2019 www.westwind-airbearings.com.

International Search Report and Written Opinion of the European International Searching Authority; PCT/US2019/046302; dated Nov. 15, 2019; European Patent Office; 14 pgs.

* cited by examiner

APPARATUS AND METHODS FOR NON-CONTACT DAMPING OF OPTICAL FIBER VIBRATION

This application claims the benefit of priority to U.S. Provisional Application Ser. No. 62/723,662 filed on Aug. 28, 2018, the content of which is relied upon and incorporated herein by reference in its entirety.

FIELD

The present disclosure relates to optical fibers, and in particular relates to apparatus and methods for non-contact damping of optical fiber vibration.

BACKGROUND

Optical fiber cables are used extensively in optical telecommunications systems. Certain types of optical fiber cables used for transmitting large amounts of data include many individual optical fibers, with the fiber count ranging from just a few to hundreds, depending on the particular application. This requires marking the individual fibers so that they can be identified in the factory as well as in the field after the optical fiber cables are deployed.

Optical fiber marking is typically performed using an optical fiber marking apparatus that includes a marking unit. Marks are made on the outer surface of the optical fiber by the marking unit as the optical fiber moves past the marking unit. It is desirable that the optical fiber moves past the marking unit at relatively high speeds, e.g., 3 meters/second (m/s) or greater, and preferably 10 m/s or greater to provide sufficient throughput. At such fiber speeds, the optical fiber can start to vibrate since it is under tension and because the apparatus has moving parts that vibrate at frequencies close to or at the fiber vibration frequencies.

If the fiber vibration becomes too great, it becomes difficult for the optical fiber marking apparatus to properly form the marks on the optical fiber. Improperly marked optical fiber can be rendered unusable when it does not meet industry identification standards.

SUMMARY

Embodiments of the disclosure are directed to vibration damping of optical fibers that vibrate when moving over an optical path of an optical fiber processing system. The vibration damping is accomplished using a plurality of air jets directed at the outer surface of the optical fiber from different directions. The air jets are generated by directing pressurized air through nozzles of an air bearing. The nozzles can be distributed over an inner surface of the air bearing, wherein the inner surface defines an aperture through which the vibrating optical fiber passes. The air bearing has a stiffness k defined by the amount of air pressure provided to the outer surface of the optical fiber by the air jets.

In an example, one or more air bearings are operably disposed relative to the optical fiber at corresponding one or more locations selected to attenuate the natural vibrational modes over a section of optical fiber where it is desirable to have a limited amount of vibration. For example, during unwinding of the optical fiber using a drive pulley and a downstream guide pulley, the first (lowest) vibrational mode for the section of optical fiber between the two pulleys is more likely to be excited than other vibrational modes and be the dominant vibrational mode since the initial displacement due to gravity has similar deflection along the given section of the optical fiber. If a single vibration damping device is applied substantially at a mid-span location of the optical fiber at a relatively strong stiffness, the first (fundamental) vibrational mode can be substantially reduced or eliminated and the second vibrational mode will become the dominant vibrational mode. Since the second vibrational mode is less excited, the overall amount of (lateral) vibration can be substantially reduced. If multiple vibration damping devices are used, not only the first vibrational mode, but also higher-order vibrational modes can be altered to suppress the overall amount of optical fiber vibration. In the case where the optical fiber processing system is an optical fiber marking system, the reduction in lateral vibration of the optical fiber at the marking location can lead to a reduction in marking errors.

An embodiment of the disclosure is directed to an apparatus for damping vibration of a vibrating optical fiber moving over an optical fiber path. The apparatus comprises: a) an air bearing comprising: a body having an aperture defined by an inner surface of the body; a central axis that passes through the center of the aperture and along which lies the optical fiber path; a plurality of nozzles distributed around the inner surface and directed toward the central axis; an air conduit within the body and that is in pneumatic communication with the plurality of nozzles; and b) an air supply pneumatically connected to the air conduit and configured to supply pressurized air to the air bearing, wherein the pressurized air is directed through the nozzles to the vibrating optical fiber to damp the vibration of the vibrating optical fiber.

Another embodiment of the disclosure is directed to an optical fiber processing apparatus that includes the apparatus described immediately above and that further comprises a marking unit positioned along the optical fiber path. The marking unit is configured to dispense a marking material to form marks on an outer surface of the vibrating optical fiber at a marking location.

Another embodiment of the disclosure is directed to a method of marking an optical fiber having an outer surface. The method comprises: moving the optical fiber past a marking unit, wherein the moving optical fiber has an amount of undamped vibration; dispensing marking material to the outer surface of the optical fiber to form at least one mark on the outer surface; and damping the undamped vibration of the moving optical fiber without physically contacting the optical fiber to define an amount of damped vibration of the moving optical fiber that is less than the undamped vibration and that is within a select fiber vibration tolerance.

Another embodiment of the disclosure is a method of processing a vibrating optical fiber. The method comprises: moving the vibrating optical fiber along an optical fiber path at a line speed greater than 3 m/s; and directing pressurized air to the optical fiber, the pressurized air having a maximum pressure $P_{MAX}$ sufficient to reduce a peak-to-peak displacement of a vibration of the vibrating optical fiber. The processing can include reducing the amount vibration of the fiber to facilitate further operations or processing performed on the fiber that are known in the art, such as marking the fiber, coating the fiber, stripping the fiber, etc.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which.

DETAILED DESCRIPTION

Figure 1A:
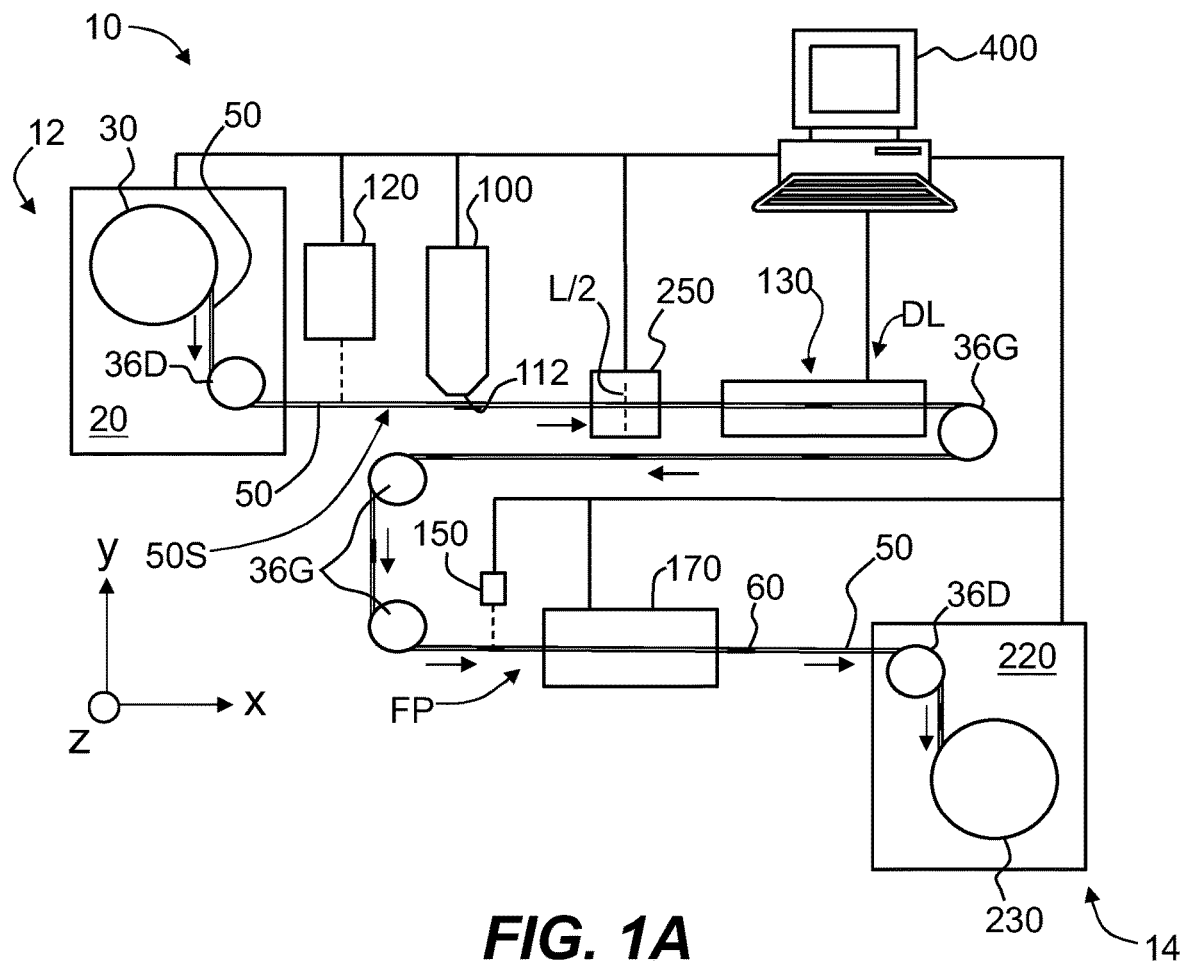
FIG. 1A is a schematic diagram of an optical fiber processing apparatus in the form of an optical fiber marking apparatus for marking an optical fiber.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

Likewise, relative terms like top, bottom, side, horizontal, vertical, etc. are used for convenience and ease of explanation and are not intended to be limiting as to direction or orientation.

The terms "downstream" and "upstream" are used herein to indicate positions relative to the direction of the movement of the optical fiber over a fiber path through the optical fiber processing apparatus as described below. Thus, an apparatus component B that is downstream (upstream) of an apparatus component A processes a given section of the optical fiber after (before) it is processed by the apparatus component A.

The abbreviation "μm" is used to denote "micron" or "micrometer," and the abbreviation "nm" is used to denote "nanometer."

The term "non-contact" as used in connection with the vibration damper disclosed herein means that that physical contact is not made with a mechanical part or portion of the vibration damper, such as by a surface or element of the vibration damper. The non-contact damping of a vibrating optical fiber is accomplished by using air jets directed from an air bearing of the vibration damper to the outer surface of the optical fiber, as described below. While the pressurized air from the air jets makes contact with the outer surface of the optical fiber, this is not considered herein to be physical contact by the vibration damper per se. Similar remarks apply when gases other than air are directed in the form of a pressurized jet from a gas bearing to an optical fiber to dampen its vibration.

The reduction in optical fiber vibration (i.e., vibration attenuation or vibration damping) by using one or more vibration dampers in an optical fiber processing apparatus and in related methods as described herein is relative to the operation of the apparatus with no vibration damping, i.e., to an amount of undamped vibration in the apparatus that would exist in the absence of vibration dampers. Thus, the optical fiber marking apparatus disclosed herein as an example optical fiber processing apparatus has an inherent amount of undamped fiber vibration that can be measured by disabling or removing the one or more vibration dampers. The reduced amount of optical fiber vibration that results when using one or more of the vibration dampers is referred to herein as the damped fiber vibration (or just "damped vibration"), which is readily measurable.

Aspects of the apparatus and methods disclosed herein apply when there is an amount of undamped vibration that makes marking of a moving optical fiber problematic because the optical fiber would be moving rapidly in and out of the optical fiber path at the marking location where the marking operation takes place.

Optical Fiber Marking Apparatus

FIG. 1A is a schematic diagram of an example optical fiber processing apparatus in the form of an optical fiber marking apparatus ("apparatus") 10 for marking an optical fiber ("fiber") 50. The vibration damping apparatus and methods disclosed herein can be applied to other types of optical fiber processing apparatus, such as optical fiber drawing apparatus, optical fiber coating apparatus, and optical fiber winding and unwinding apparatus, and any other apparatus where an optical fiber is moved over a fiber path and has an amount of vibration as it moves over the fiber path.

Figure 1B:
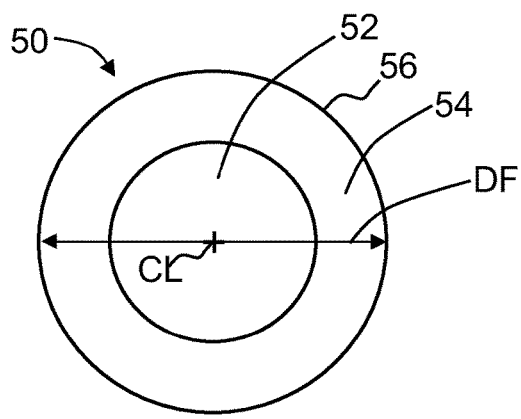
FIG. 1B is a close-up cross-sectional view of an example optical fiber.

The example apparatus 10 has a first or starting end 12 at which the fiber 50 is paid out and a second or finishing end 14 at which the fiber is taken up and stored. The fiber 50 shown in cross-sectional view in FIG. 1B. The fiber 50 has a glass section 52 that includes a glass core and a glass cladding (not shown), and a first protective non-glass coating layer ("first coating") 54 (e.g., a polymer such as acrylate or urethane) that is common to almost all optical fibers. The first coating 54 is used to protect the glass section 52 from being damaged. The first coating 54 has an outer surface 56. The fiber 50 has a centerline CL that defines an axial direction down the fiber and also has a fiber diameter DF.

With reference again to FIG. 1A, the apparatus 10 includes at the first end 12 a payout module 20. The payout module includes a storage reel 30 that stores a length of the fiber 50. The apparatus 10 also includes at the second end 14 a take-up module 220. The take-up module 220 includes a storage reel 230 that stores the processed fiber 50, as explained below. The payout module 20 and the take-up module 220 can each include a drive pulley 36D used to drive the fiber 50 over a fiber path FP through the apparatus 10 from the payout module 20 to the take-up module 220. In an example, the fiber path FP is defined at least in part by one or more guide pulleys 36G, such as the multiple guide pulleys as arranged and shown in FIG. 1A. Other arrangements of the guide pulleys 36G can also be effectively employed in apparatus 10. The fiber 50 has a fiber speed (or line speed) SF over the fiber path FP. The section of optical fiber 50 between the drive pulley 36D of the payout module 20 and the first downstream guide pulley 36G is denoted 50S.

The apparatus 10 further includes a marking unit 100 that resides downstream of the payout module 20. The marking unit 100 has output end 112 located proximate to the fiber path FP. The marking unit 100 resides at a marking location ML along the fiber path FP (see FIG. 6A). A position sensor 120 is operably arranged relative to the fiber path FP to measure a displacement of the fiber 50 relative to a reference position, e.g., the fiber path. The position sensor 120 can reside upstream or downstream of the marking unit 100. A dryer unit 130 resides downstream of the position sensor 120 and defines a drying location DL along the fiber path FP.

A mark counter 150 resides immediately downstream of the dryer unit 130 and is operably arranged relative to the fiber path FP. A coating system 170 resides downstream of the marking counter 150. The fiber path FP passes through the coating system 170.

The aforementioned take-up module 220 resides immediately downstream of the coating system 170 at the second (finishing) end 14 of the apparatus 10. In an example, the coating system 170 can include a coating applicator and a curing system (not shown).

The apparatus 10 also includes at least one non-contact vibration-damping apparatus ("vibration damper") 250 arranged in the fiber path FP at a location selected to reduce the amount of (undamped) vibration in the fiber section 50S. In an example, a first vibration damper 250 is operably disposed at a mid-span location L/2 of the fiber section 50S, wherein the mid-span location is half-way between the drive pulley 36D of the payout module and the first downstream guide pulley 36G (see also FIG. 4A, introduced and discussed below). A second vibration damper 250 can be operably disposed at another location along the fiber path FP and relative to the fiber section 50S, as explained below. The vibration damper 250 is described in greater detail below. Additional vibration dampers 250 can also be employed within the fiber section 50S or at other locations along the fiber path FP as desired.

The apparatus 10 includes a controller 400 that is operably connected to the payout module 20, the take-up module 220, the marking unit 100, the position sensor 120, the dryer unit 130, the mark counter 150, the coating system 170 and the at least one vibration damper 250. The controller 400 is configured to control these apparatus components and the overall operation of the apparatus 10, including the fiber speed SF of the fiber 50 through the apparatus over the fiber path FP.

In an example, the controller 400 comprises a programmable logic controller (PLC) configured to carry out instructions (software, firmware, etc.) embodied in a non-transitory computer-readable medium and that cause the apparatus 10 to carry out the methods disclosed herein. In some examples, the controller 400 need not be connected to and control some of the apparatus components that could be operated independently. Also in some embodiments, the controller 400 can be operably connected to at least one of the first and second vibration dampers 250 to control the amount of vibration damping. In one example, the vibration damper 250 can be operably supported by a movable support stage 252 (see FIG. 6A) that can be moved by the controller 400 to adjust (e.g., minimize) the amount of vibration in the fiber 50 based on position (vibration) measurements made by the position sensor 120.

While the fiber speed SF can be relatively slow (e.g., 0.5 m/s), the apparatus and methods disclosed herein are particularly useful for fiber speeds SF at which the vibration of the fiber 50 starts to result in marking errors that exceed a reasonable marking error tolerance. In an example, apparatus and methods disclosed herein preferably operate at fiber speeds SF in the range from about 3 m/s up to a maximum possible fiber speed, which presently is about 25 m/s.

With continuing reference to FIG. 1A, as part of the setup of apparatus 10, the storage reel 30 of fiber 50 is loaded into the payout module 20. The fiber 50 is then fed through the nearby drive pulley 36D and led over the fiber path FP through the various apparatus components and to drive pulley 36D of the take-up module 220 and onto the take-up reel 230.

Once the fiber 50 is set up to travel over the fiber path FP through the apparatus 10 and its various components as described above, the controller 400 activates the drive pulleys 36D of the payout module 20 and the take-up module 220 to start moving the fiber over the fiber path FP at a select speed SF.

Once the fiber 50 starts moving at the select fiber speed SF, the controller 400 activates the marking unit 100. This includes causing the marking unit to dispense at its output end 112 a marking material 114, such as ink. In an example, the marking unit 100 comprises an ink-jet printer head that dispenses ink-jet ink at the marking material. The dispensed marking material 114 is directed to the outer surface 56 as the fiber 50 passes by or through the marking unit 100 while traveling at the fiber speed SF. The marking material 114 is dispensed for a brief time interval so that the marking material defines a mark 60. The controller 400 also controls a time interval between activation of the marking unit 100 so that the marks 60 are axially spaced part (i.e., in the x-direction).

Once the marking material 114 is deposited on fiber 50 to form the mark 60, the marking material may need to be dried so that the mark becomes substantially permanent. In this case, the drying is accomplished by sending the marked fiber 50 through the dryer unit 130. The marked fiber 50 then passes by the marking counter 150, which counts the number of marks, e.g., as a measured number density $N_M$ of marks per unit length (e.g., marks per meter). The measured number density $N_M$ from the mark counter 150 is sent to the controller 400 and compared to the expected (selected) number density N. The mark counter 150 is used to ensure that the correct number density N is being formed, to spot any missing marks 60, to find extra marks, and to identify incorrectly formed marks. Such marking errors can arise due to problems with the fiber speed SF, and especially excess lateral vibration of the fiber 50, as explained in greater detail below.

Figure 1C:
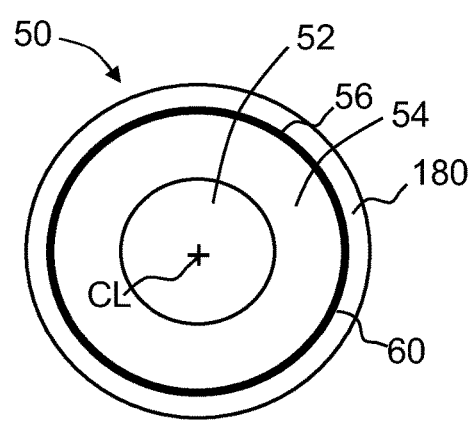
FIG. 1C is a close-up cross-sectional view of an example marked and coated optical fiber.
Figure 2:
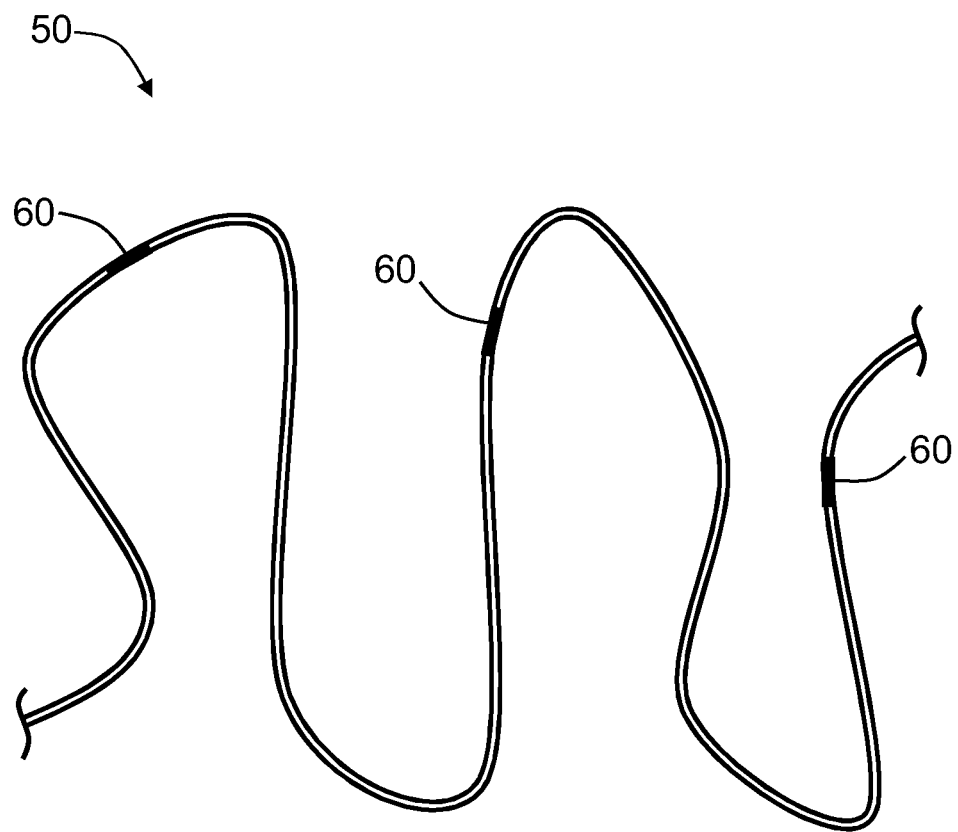
FIG. 2 is a schematic diagram of a section of a marked optical fiber showing example spaced-apart marks.

The marked fiber 50 continues to the coating system 170, which applies a protective coating 180 over the entire outer surface 56 of the fiber 50, including any marks 60 thereon. FIG. 1C is similar to FIG. 1B and shows an example of a marked and coated fiber 50, wherein the mark 60 is shown as extending all the way around the circumference of the fiber by way of example. A section of the resulting marked and coated fiber 50 is shown in FIG. 2.

In an example, the protective coating 180 is at least semi-transparent so that the marks 60 are visible through the protective coating 180. Further in an example, the coating 180 can be colored (e.g., via a pigment) to define a colored protective coating 180, e.g., yellow for submarine fibers 50. The main purpose of the protective coating 180 is to protect the marks 60 from external wear, such as from handling by field personnel, abrasion or rubbing against adjacent fibers or cable surfaces, etc. The marked and coated fiber 50 continues to the take-up module and is taken up by and stored in take-up reel 230.

Other configurations for apparatus 10 can be employed herein, including disposing the coating system 170 upstream of the marking unit 100 so that the marks 60 are formed on the protective coating 180, in which case the protective coating need not be substantially transparent. In other configurations, coating system 170 is excluded from apparatus 10 and marks are applied directly to outer surface 56 of coating 54 without applying a protective coating.

Fiber Vibration

Figure 3:
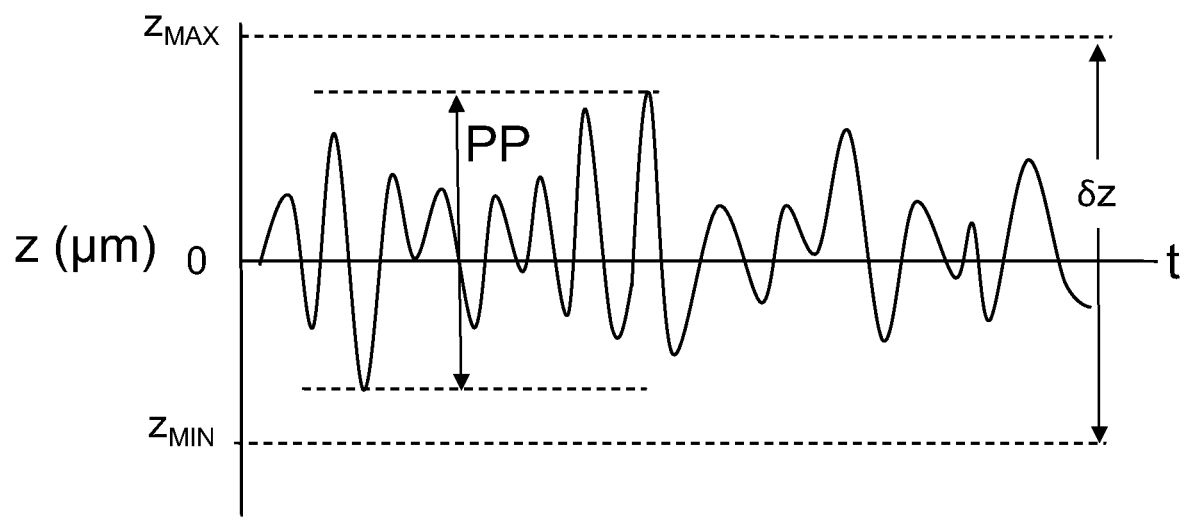
FIG. 3 is a schematic plot of the z-displacement z (μm) of the optical fiber versus time t (arbitrary units) as measured by the position sensor, and illustrating vibration of the fiber with a peak-to-peak vibration (PP) and also showing an example vibration tolerance δz on the amount of (lateral) fiber vibration in the vicinity of the marking unit.

FIG. 3 is a schematic plot of the z-position z (μm) (FIG. 1, FIG. 6A) of the fiber 50 versus time (arbitrary units) as measured at one location on the fiber that resides beneath the position sensor 120 and in an example in close proximity to the marking unit 100. The plot of FIG. 3 illustrates an example of how the fiber 50 can be displaced in the z-direction (i.e., in a plane perpendicular to the direction of the marking material deposition direction, which is in the −y direction (FIG. 6A)) as the fiber moves along the fiber path FP. In an example, the z-position of the fiber 50 as measured by the position sensor 120 is sent to the controller 400 for recording (storing) and optional additional processing. The z-position displacements occur over relatively short time intervals (fractions of a second) and are caused by vibration of the fiber 50 as it moves over the fiber path FP and interacts under tension with the various components of the apparatus 10. The plot of FIG. 3 shows the upper and lower limits $Z_{MAX}$ and $z_{MIN}$ that define a z-displacement tolerance δz ($δz=Z_{MAX}-Z_{MIN}$) as well as the maximum measured peak-to-peak displacement, denoted PP and also referred to hereinafter as the PP displacement. The z-displacement tolerance δz is also referred to herein as the vibration tolerance and provides a measure of the acceptable amount of vibration of the fiber 50.

The vibrations of fiber 50 are due to one or more sources in the apparatus 10. A primary source of fiber excitations from a varying tension force generated by unwinding the fiber 50 from the storage reel 30 in the payout module 20 so that the fiber can travel over the fiber path FP. When the tension force is small, the fiber 50 tends to sag due to gravity. If the tension force is suddenly increased, the fiber 50 fluctuates from the deformed configuration under gravity. Another source of fiber excitation is uneven operation of the guide pulleys 36G and drive pulleys 36D. A rapid change in the rotation of these pulleys can cause a sudden change of fiber tension and lateral displacements of the fiber 50. Another source of fiber excitation is general vibration of the apparatus 10 (e.g., from drive motors, not shown) at a frequency close to one of the natural vibration frequencies of the fiber 50. Increased fiber vibration is also associated with increased fiber (line) speed SF.

To ensure that the marks 60 are properly formed by the apparatus 10, the fiber 50 cannot deviate in the z-direction from the fiber path FP beneath the marking unit 100 by more than the select displacement tolerance δz, which in an example is δz<40 μm or even smaller (e.g., δz<30 μm or δz<20 μm or even δz<10 μm). Deviations in the y-direction (FIG. 6A) are not as critical since such deviations do not cause a misalignment between the output end 112 of the marking unit 100 and the fiber 50. The position sensor 120 can be used to measure such positional deviations. In an example, the position sensor 120 is optics based and uses a light beam 122 to determine the z-position of the fiber 50 as function of time. Rapid variations of the z-position of the fiber 50 relative to a reference position (e.g., the ideal fiber path FP at the marking unit 100) constitute lateral fiber vibrations.

Figure 4A:
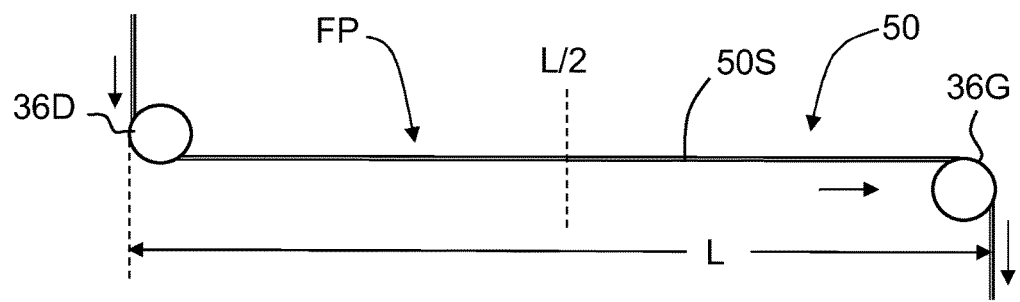
FIG. 4A is a close-up view of the fiber path corresponding optical fiber section of the portion of the apparatus between the first drive pulley of the payout module and the first guide pulley.

FIG. 4A is a close-up view of fiber path FP of the apparatus 10 between the first drive pulley 36D of the payout module 20 and the first guide pulley 36G. The fiber section 50S that extends between the first drive pulley 36D and the first guide pulley 36G has a length L and a mid-span location L/2, which is midway between the drive pulley 36D of the payout module 20 and the first downstream guide pulley 36G.

Figure 4B:
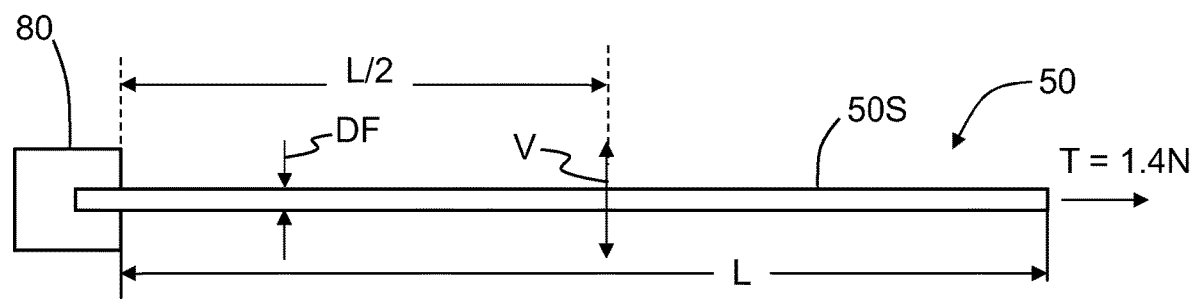
FIG. 4B is a free-body diagram of the fiber section of the portion of the apparatus shown in FIG. 4A.

FIG. 4B is a free-body diagram of the portion of the apparatus 10 and the fiber section 50S as shown in FIG. 4A. The fiber section 50S has one end secured by a hypothetical securing member 80 and an opposite end that is under an amount of tension T as the fiber is pulled along the fiber path FP at a given fiber speed SF. The configuration depicted in FIG. 4B is used to illustrate possible modes of vibration of fiber 50 as it moves along fiber pathway FP (see FIGS. 5A-5E). The securing member 80 corresponds to the drive pulley 36D of the payout module 20 while the length L and tension T are defined at least in part by the first downstream guide pulley 36G along the fiber path FP. Vibrations V are imparted to the fiber section 50S by vibrations that occur in the apparatus 10 due to its moving parts and communicated to the fiber 50 through drive pulleys 36D and guide pulleys 36G, which are in contact with the fiber. These apparatus-induced vibrations can be imparted to the fiber section 50S in the schematic diagram of FIG. 4B through movement (vibration) of the securing member 80.

FIGS. 5A through 5F are the first through sixth vibrational undamped (unattenuated) modes VM1 through VM6 of the fiber section 50S, under conditions in which the fiber section 50S has a fiber diameter DF of 250 microns, a length L of 1.5 m, and a tension T of 1.5 Newtons (N). For purposes of illustration using a model of vibrational modes, the fiber section 50S is assumed to have a Young's modulus of 47,744 MPa, a Poisson's ratio of 0.35, and density of 1460 kg/m$^3$. The vibrational frequencies for the first through sixth vibrational modes VM are denoted f1 through f6, respectively.

Table 1 below summarizes the frequencies f1 through f6 (Hz) for the six undamped vibrational modes VM1 through VM6 of the fiber section 50S.

TABLE 1

| Vibrational Mode | Frequency (Hz) |
| --- | --- |
| VM1 | 47.365 |
| VM2 | 94.735 |
| VM3 | 142.11 |
| VM4 | 189.50 |
| VM5 | 236.90 |
| VM6 | 284.33 |

Figure 5A:
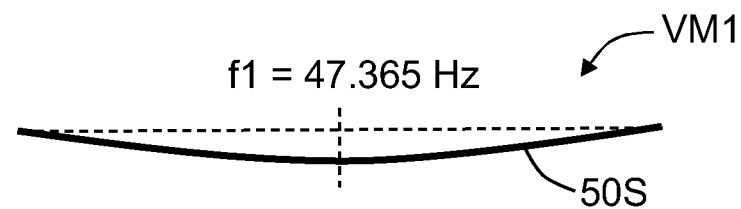
FIGS. 5A through 5F are schematic representations of the first six vibrational modes of the optical fiber of FIG. 4 without any vibration damping.
Figure 5B:
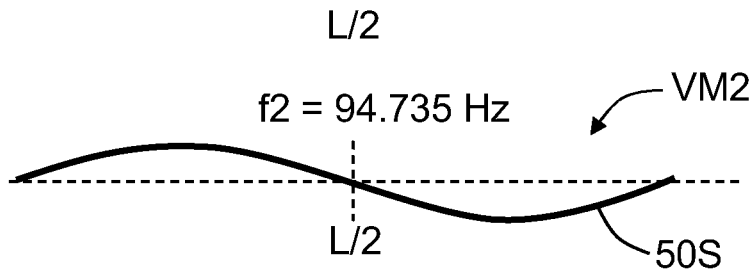
Figure 5C:
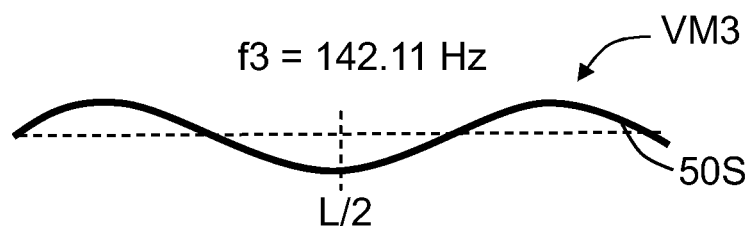
Figure 5D:
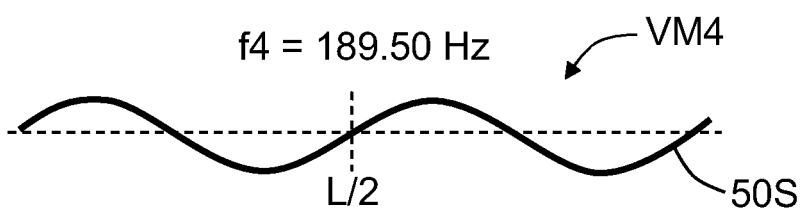
Figure 5E:
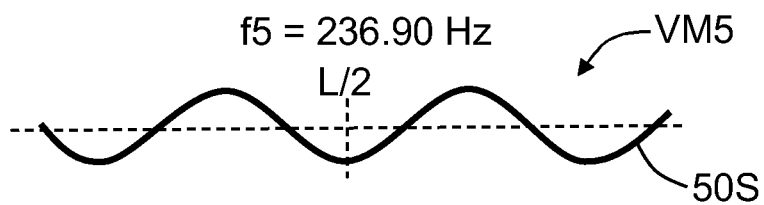
Figure 5F:
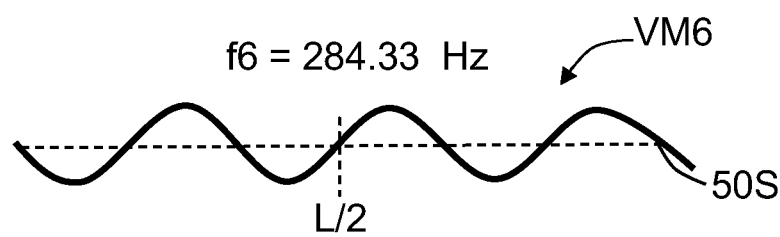

In practice, the first (fundamental) mode (VM1) shown in FIG. 5A is most likely to be excited by an initial displacement induced by gravity as fiber 50 is unwound from storage reel 30 and conveyed along fiber path FP. In addition, the maximum relative lateral displacement (vibration amplitude) occurs at the mid-span (i.e., L/2) for the first vibrational mode. It is believed that this fundamental mode vibration and the maximum displacement at the mid-span location of L/2 are mainly responsible for improper (including missing) marks 60, i.e., are the main contribution to marking errors in apparatus 10.

Vibration Damper Positioning

Figure 6A:
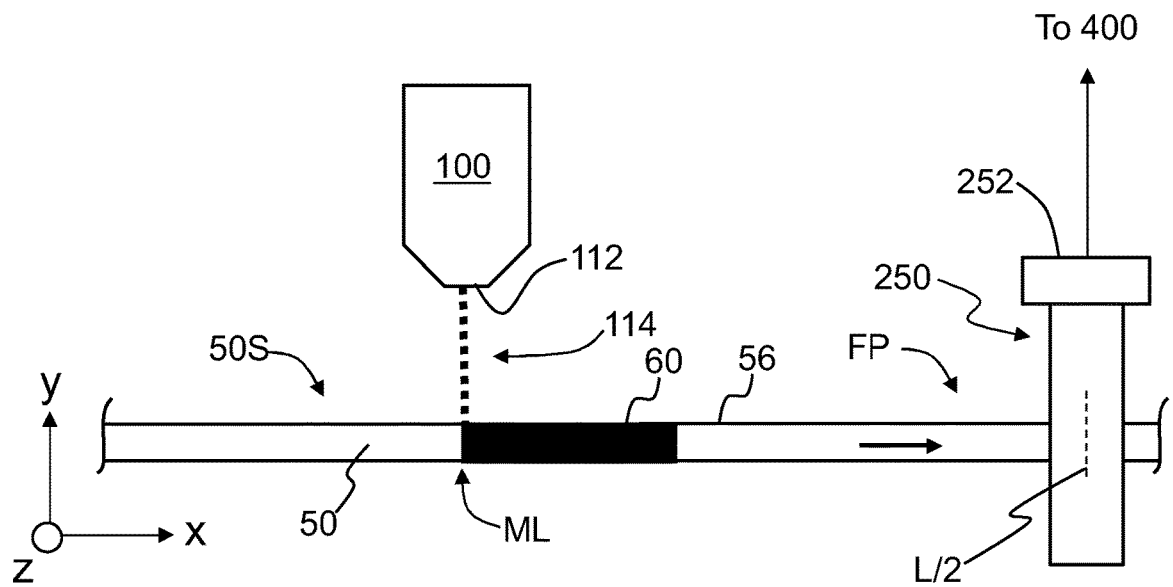
FIG. 6A is a close-up view of the portion of the apparatus that includes the marking unit and the position sensor and illustrates an example wherein the apparatus includes a single vibration damper disposed in the fiber path FP immediately upstream of the marking unit.
Figure 6B:
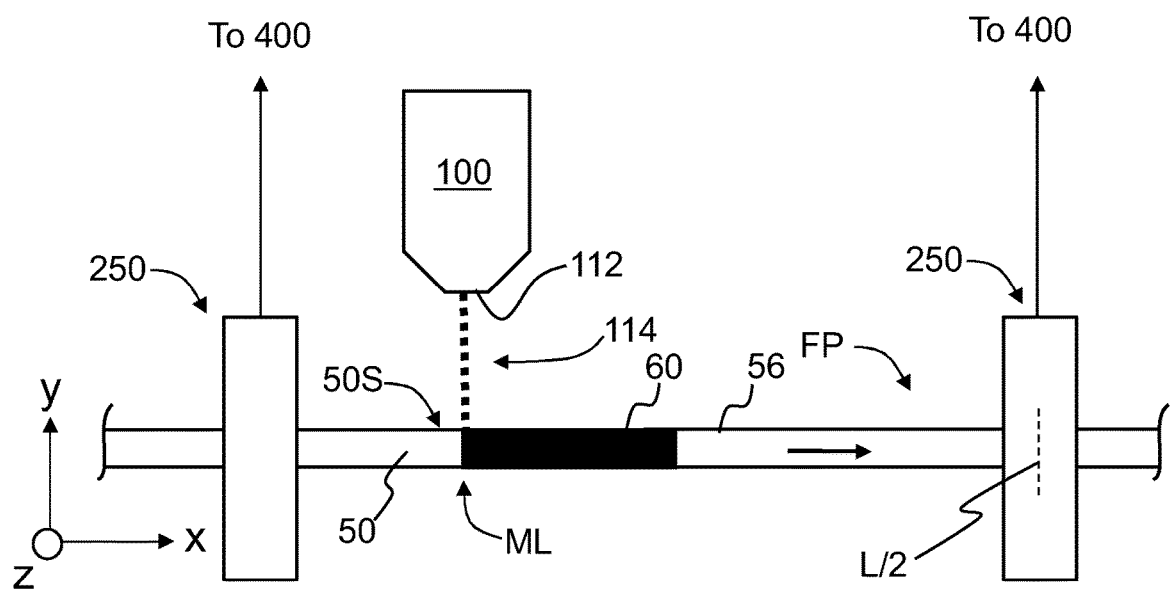
FIG. 6B is similar to FIG. 6A and illustrates an example where the apparatus includes a second vibration damper disposed in the fiber path downstream of the marking unit and at a mid-span location.

FIG. 6A is a close-up view of the portion of the apparatus 10 that includes the marking unit 100 and the position sensor 120 and illustrates an example wherein the apparatus 10 includes a first vibration damper 250 disposed in the fiber path FP at the (effective) mid-span location L/2, which in the example shown is downstream from the marking unit 100. FIG. 6B is similar to FIG. 6A and illustrates an example where the apparatus 10 includes a second vibration damper 250 disposed in the fiber path FP upstream of the marking unit 100. The location of the second vibration damper 250 can be selected to damp a select vibrational mode other than the fundamental vibration mode. In an example, the preferred location of the first or first and second vibration dampers 250 can be determined empirically by measuring the vibration V at various positions along the fiber path, and particularly at the marking location ML. This process can include operating the one or more vibration dampers 250 while changing their location along the fiber path FP (e.g., under the operation of the controller 400) until the amount of vibration at the marking location (i.e., the peak-to-peak vibration PP; see FIG. 3) is within the displacement tolerance δz. Likewise, the marking unit 100 can be moved to a location along the fiber path FP where the amount of vibration V is within the lateral displacement tolerance, and in a particular example has the lowest amount of vibration.

Vibration Damper Embodiments

Figure 7A:
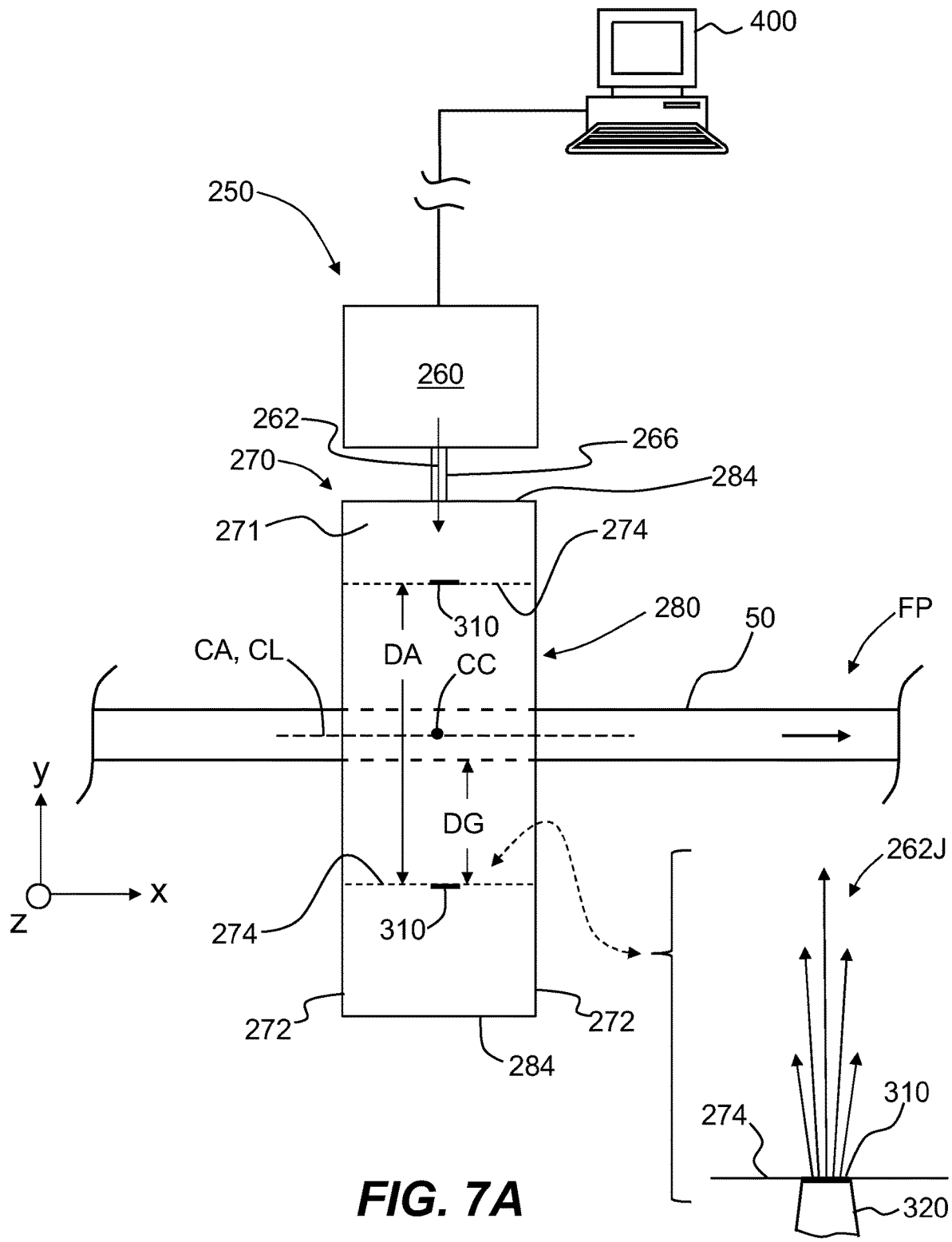
FIGS. 7A and 7B are schematic side views of an example vibration damper.
Figure 7B:
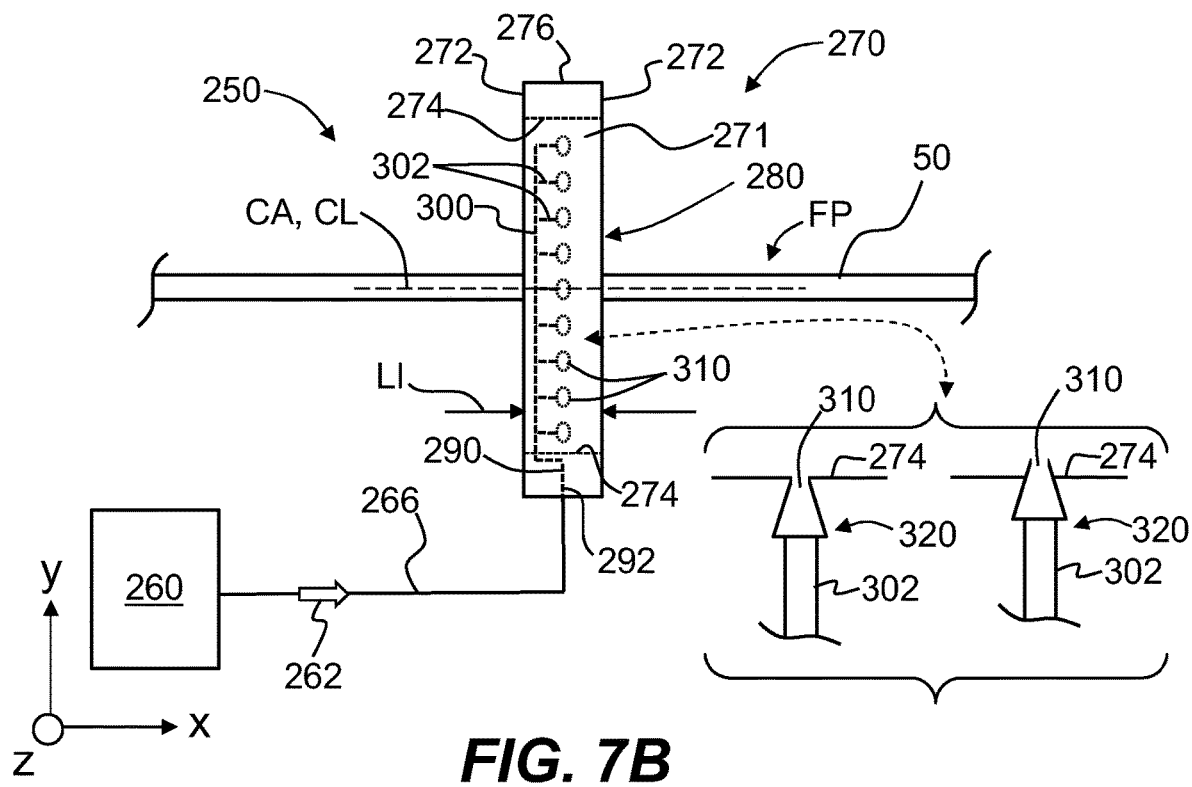
Figure 7C:
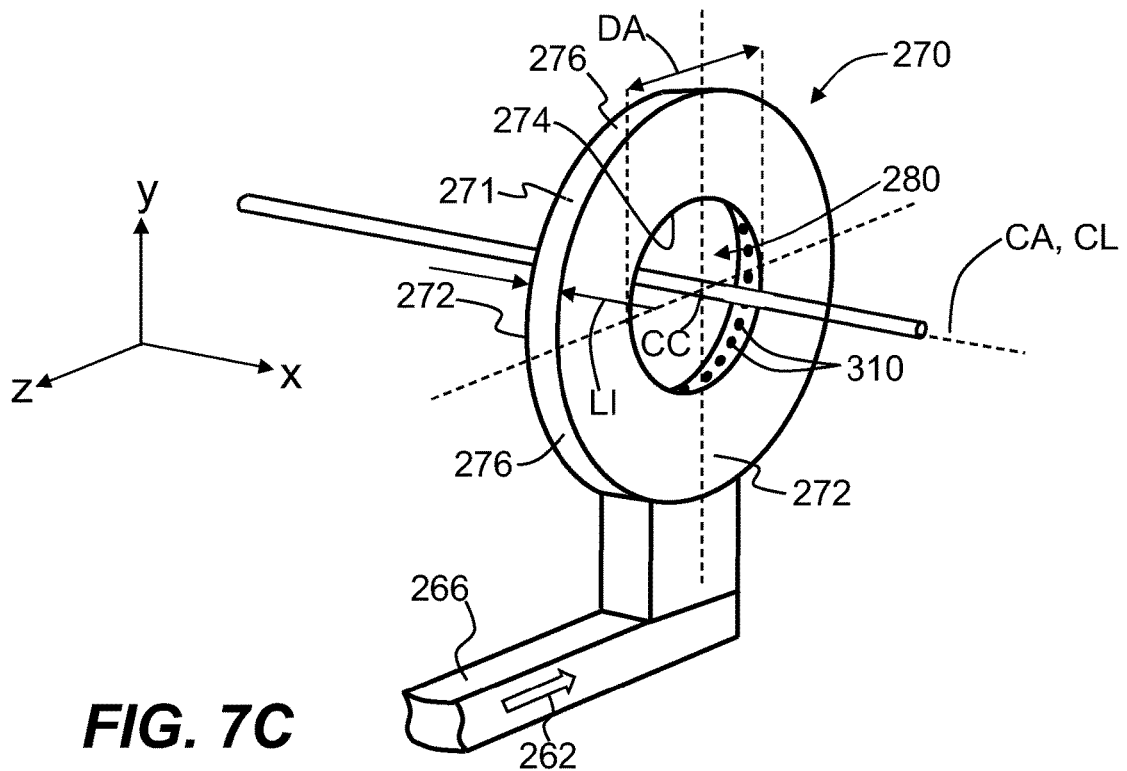
FIGS. 7C and 7D are a front elevated view of the example vibration damper.
Figure 7D:
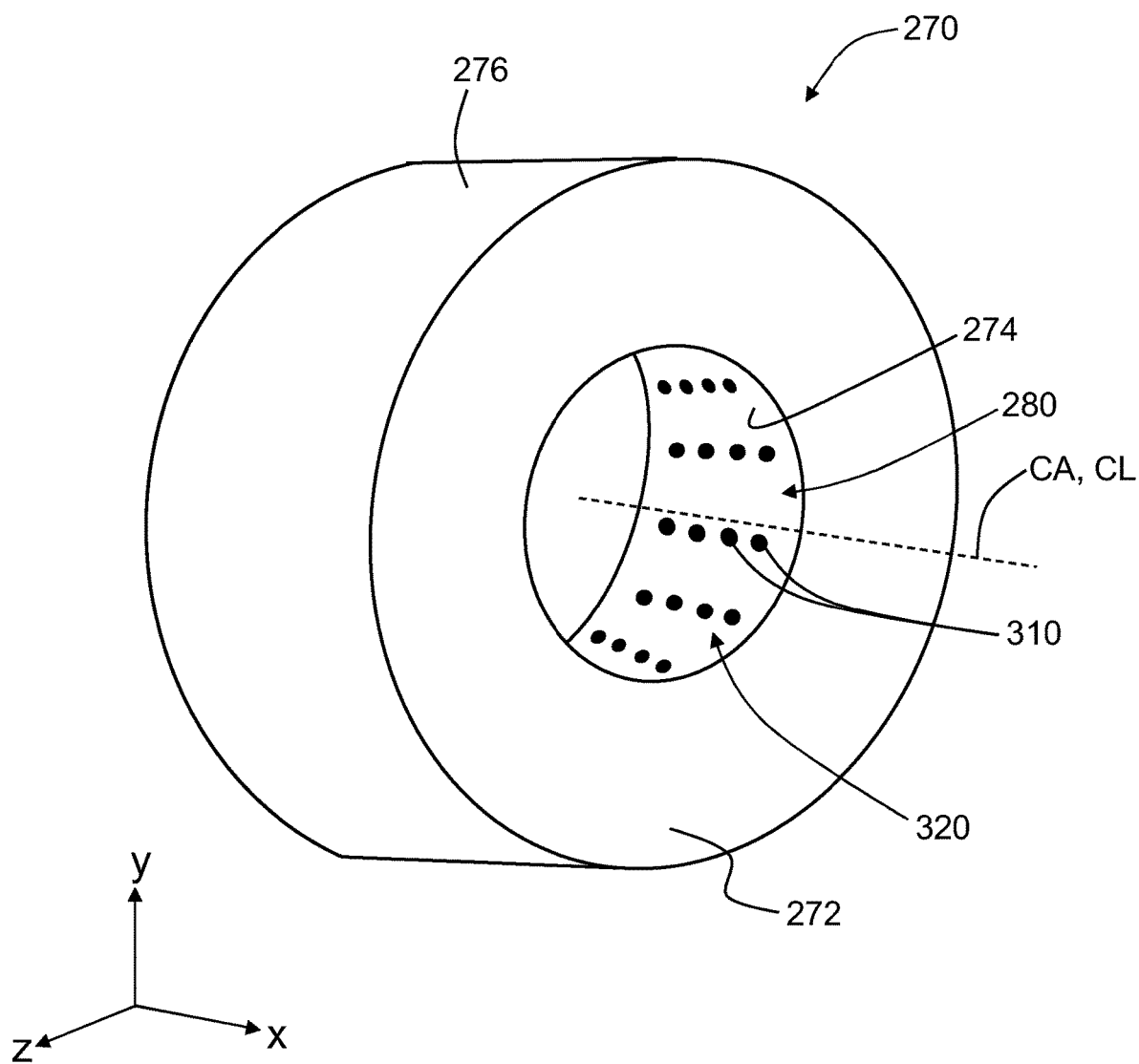

FIGS. 7A and 7B are schematic side views of an example vibration damper 250. FIGS. 7C and 7D are a front elevated view of the example vibration damper. For purposes of illustration, the following discussion of vibration damper 250 is based on air as the operable pressurized medium for controlling fiber vibration. It is understood, however, that gases other than air may alternatively be used for the same purpose to achieve the same effect. The vibration damper 250 comprises an air supply 260 (e.g., an air compressor) that supplies pressurized air 262. The air supply 260 can be operably connected to and controlled by the controller 400. The vibration damper 250 also includes an air bearing 270 that is in pneumatic communication with the air supply 260 via an airline 266.

In an example, the air bearing 270 has a body 271 with opposite sides 272 and an aperture 280 defined by an inner surface 274 of the body. The aperture 280 has a center CC that lies along a central axis CA of the aperture. The body 271 also has outer surface 276. In an example, the aperture 280 has a circular cross-sectional shape with a diameter DA and an axial length LI. In an example, the aperture 280 resides in a central portion of the body 271 such as shown in the embodiment of FIG. 7C, in which case it constitutes a central aperture.

In an example, the body 271 of the air bearing 270 includes an air conduit 290 having an input location 292 (e.g., an input end) that is operably connected to the airline 266. In an example, the air conduit 290 is defined by a cavity formed within the body 271 of the air bearing 270. In another example, the body 271 is defined by the air conduit 290.

The air conduit 290 can include an air manifold section 300 that in an example includes air conduit sections 302 that lead to openings 310 in or near the inner surface 274. Each air conduit section 302 (or a portion thereof) and the corresponding end opening 310 define a nozzle 320, as shown in the close-up inset of FIG. 7B. In an example, the nozzles 320 can be flush with the inner surface 274 or protrude therefrom toward the center CC of the aperture 280. The nozzles 320 can have a narrowing taper that serves to concentrate the flow of pressurized air 262 leaving the nozzle end opening 310. The nozzles 320 are directed radially inward and point toward the central axis CA of the aperture 280 (see also FIGS. 10C and 10D, introduced and discussed below).

The configuration of the air bearing 270 of FIGS. 7B 7C, and 7D defines an air knife where the pressurized air 262 is directed to the center CC of the aperture 280 from the openings 310 on the inner surface 274 in the form of an air jet 262J (see inset, FIG. 7A). The air jets 262J create a force on the outer surface 56 on the fiber 50 from opposing directions. The overall amount of force per unit displacement of the fiber 50 applied by air from the air jets 262J to the fiber 50 is referred to herein as the "stiffness" and is given the symbol "k". Stiffness measures the resistance to vibrational displacement of fiber 50 provided by air from the air jets 262J. Stiffness is expressed herein in units of Newtons/meter (N/m). The stiffness is a measure of the resistance provided by pressurized air 262 to displacement of fiber 50 from the central axis CA of the aperture 280.

Figure 8A:
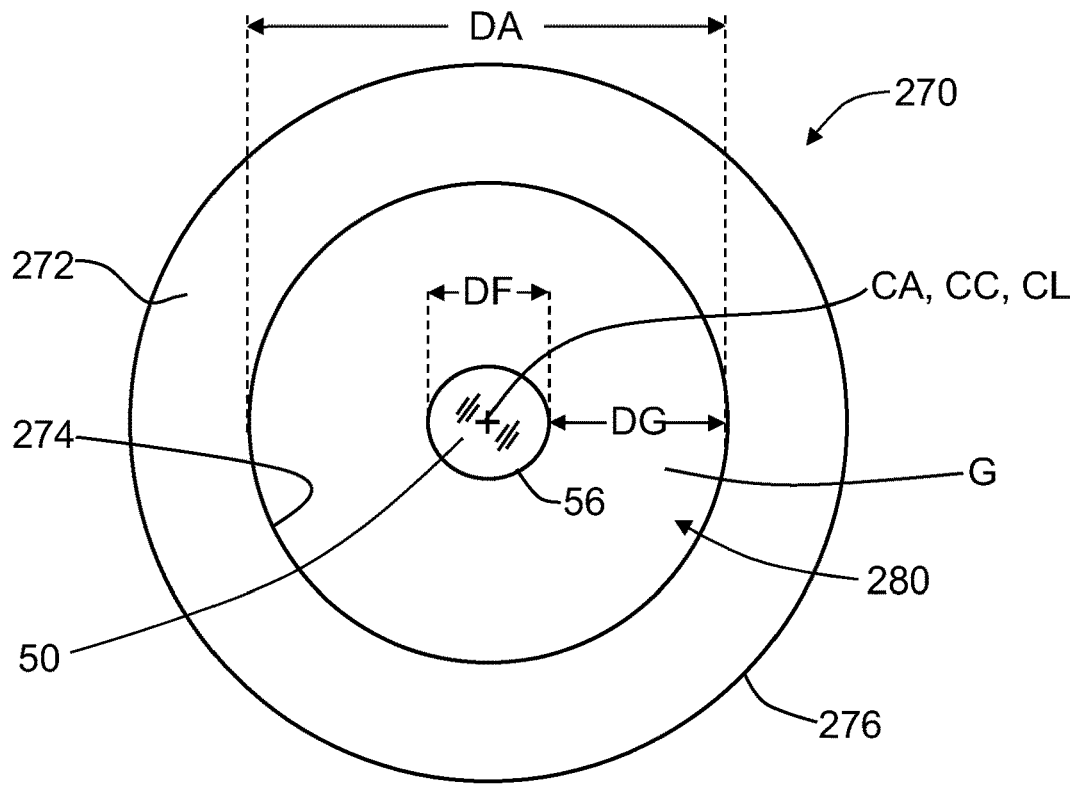
FIGS. 8A and 8B are simplified end-on views of example air bearings that illustrate two different configurations wherein the gap between the optical fiber and the inner surface of the air bearing is relatively large (FIG. 8A) and wherein the gap is relatively small (FIG. 8B).
Figure 8B:
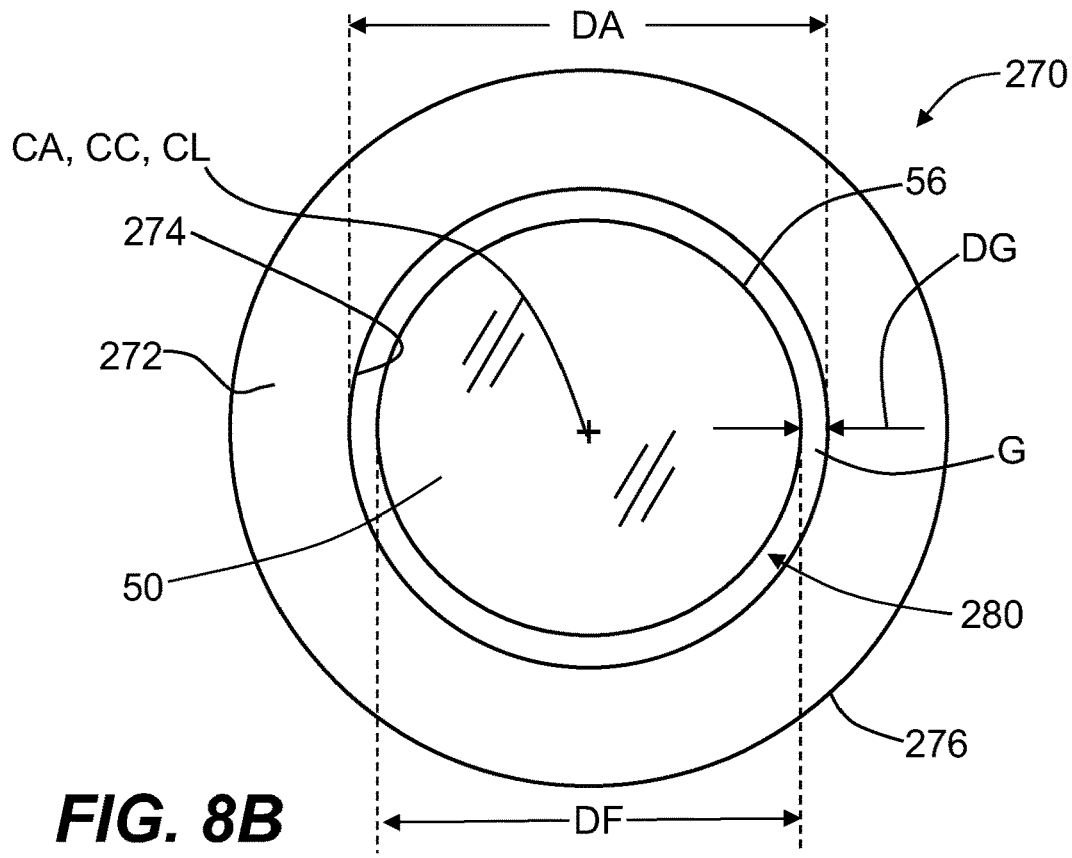

FIGS. 8A and 8B are simplified end-on views of example air bearings 270 that illustrate two different configurations for the aperture 280, showing the fiber 50 passing through the center CC of the aperture along the central axis CA so that the fiber centerline is coaxial with the central axis CA of the air bearing. This defines a gap region G having a radial dimension or "gap size" of DG. In FIG. 8A, the aperture diameter DA is substantially larger than the fiber diameter DF so that the gap size DG is relatively large. In FIG. 8B, the aperture diameter DA is only slightly larger than the fiber diameter DF so that the gap size DG is relatively small.

Figure 9A:
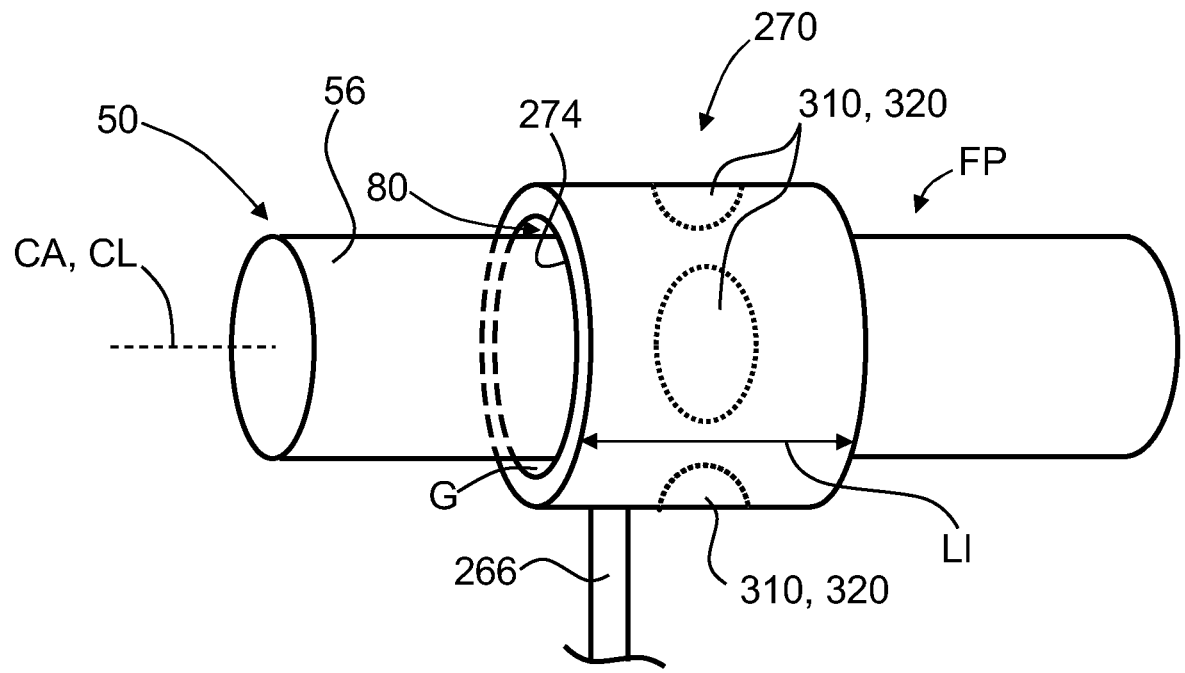
FIGS. 9A and 9B are front elevated and end-on views of an example air bearing similar to that of FIG. 8B wherein the gap (G) is relatively small.
Figure 9B:
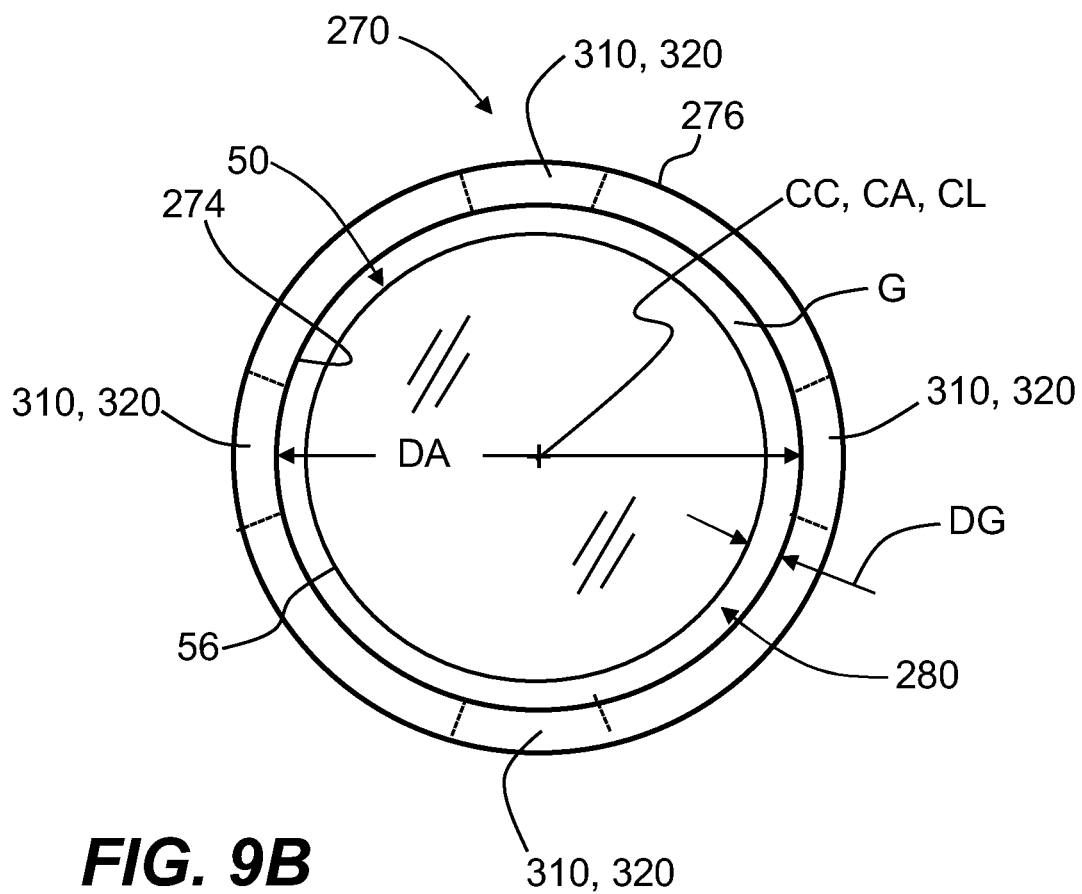
Figure 10A:
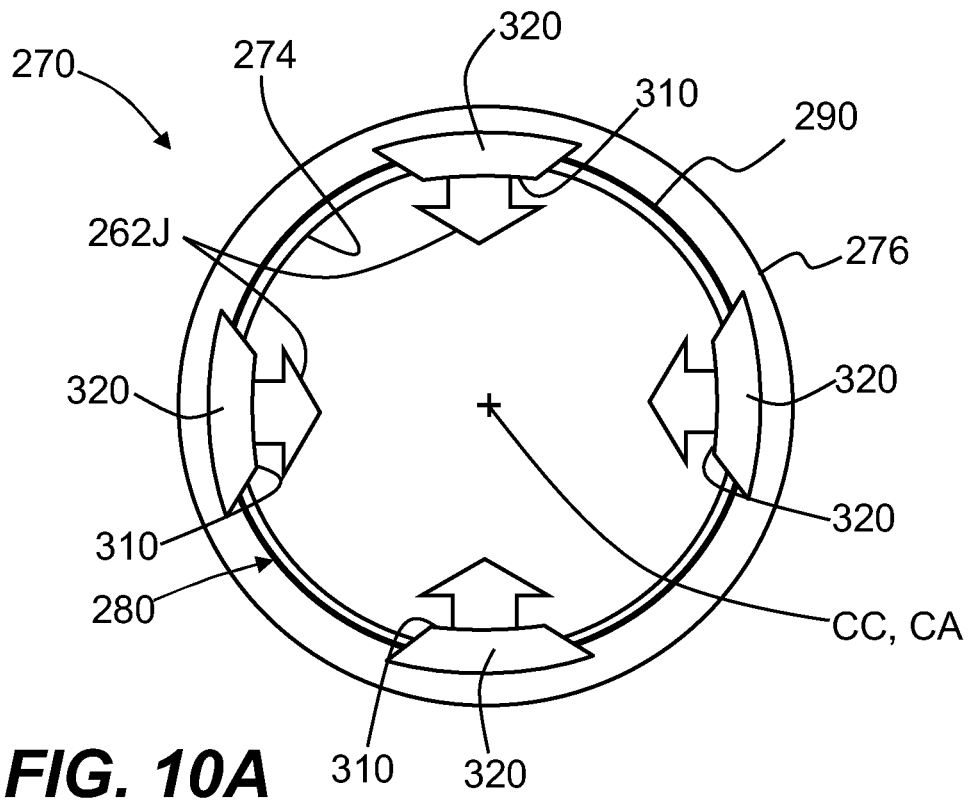
FIGS. 10A through 10C are end-on views that illustrate different configurations of the air bearing without the optical fiber present and having different numbers of nozzles.
Figure 10B:
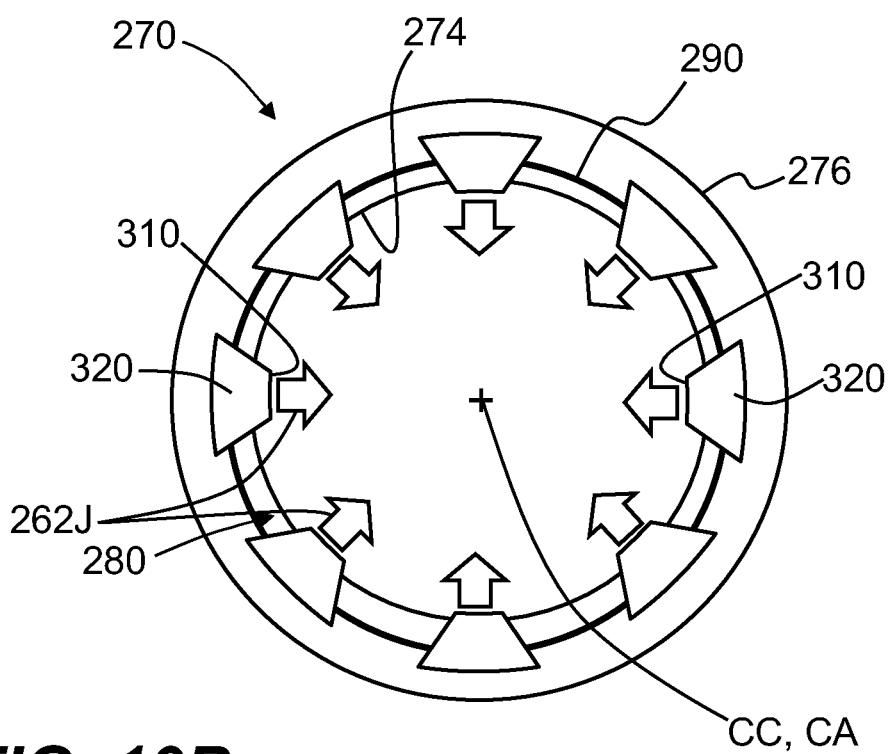
Figure 10C:
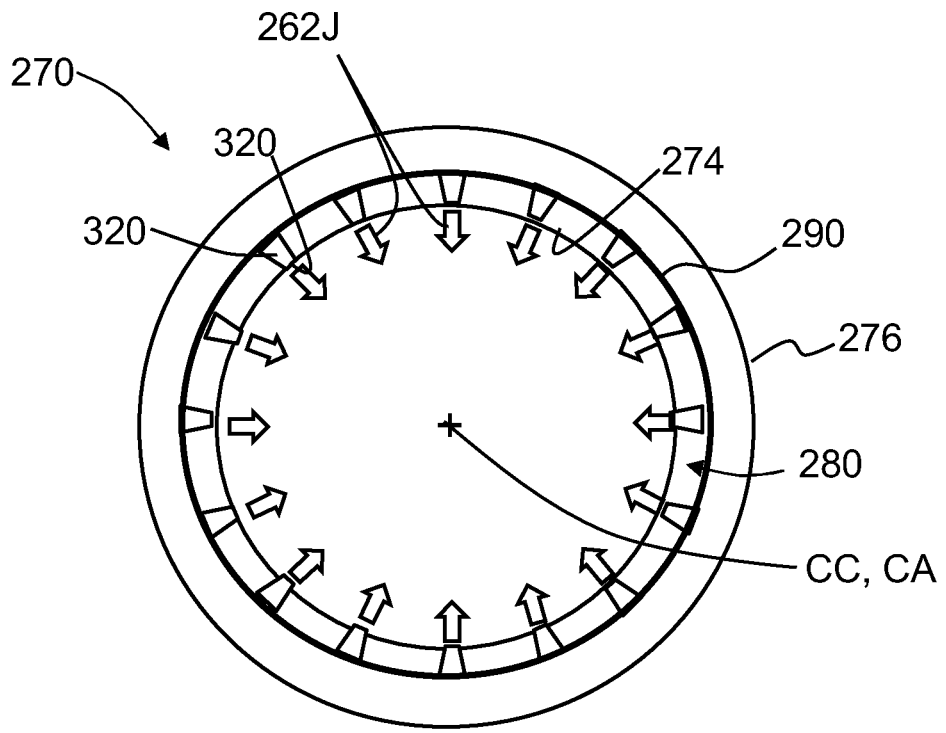

FIG. 9A is a front elevated view and FIG. 9B is a front-on view showing an example air bearing 270 wherein size DG of the gap G between the fiber outer surface 46 and the inner surface 274 that defines the aperture 280 is relative small. The example air bearing 270 also includes four nozzles 320 evenly distributed around the perimeter of the inner surface 274. FIGS. 10A through 10C are end-on views that illustrate different configurations of the air bearing 270 without the fiber 50 and having different numbers of nozzles 320. The number of nozzles 320 is at least 2, or at least 4, or at least 8, or at least 16, or at least 32, or at least 64, or in the range from 2 to 128, or in the range from 4 to 64, or in the range from 4 to 32, or in the range from 4 to 16.

Figure 10D:
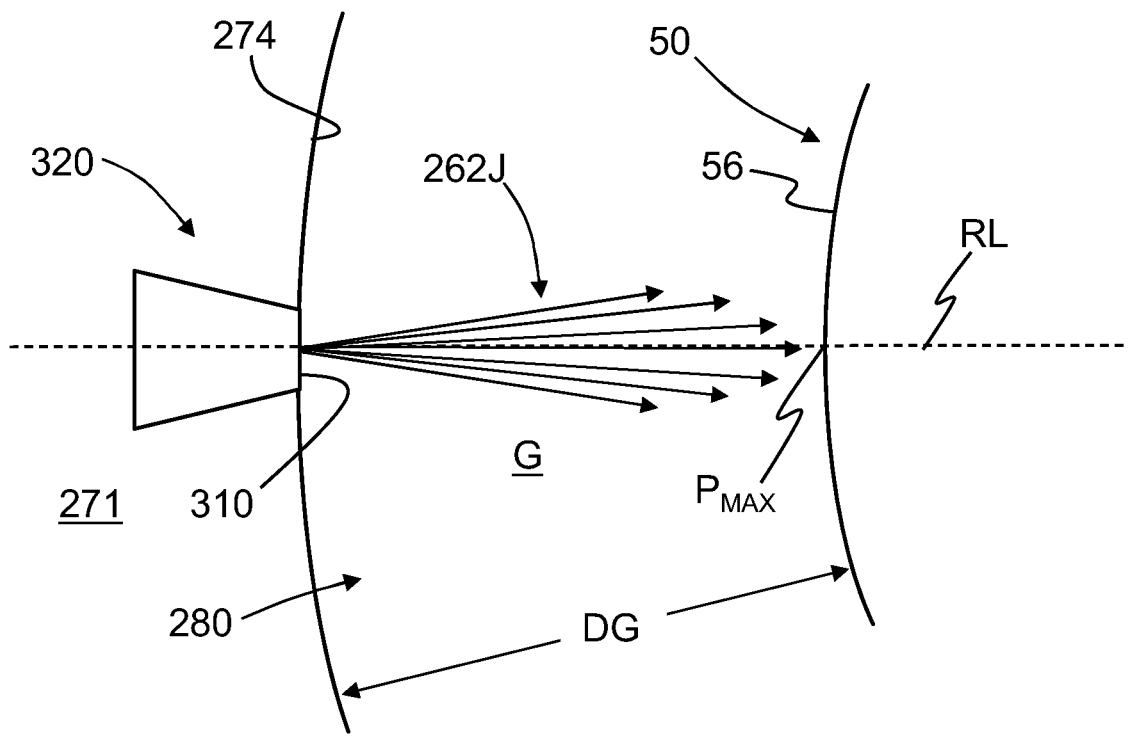
FIG. 10D is a close-up view of an example nozzle showing the pressurized air as an air jet that emanates from the end opening in the nozzle and that traverses the gap (G) to impinge upon the outer surface of the fiber.

FIG. 10D is a close-up view of one of the nozzles 320 showing the pressurized air 262 formed as an air jet 262J that emanates from the end opening 310 in the nozzle, traverses the gap G and impinges upon the outer surface 56 of the fiber 50 through the gap G. The maximum pressure $P_{MAX}$ at the outer surface 56 of the fiber is along the radial line RL from the center CC of the aperture 280 (see FIG. 10C) to the center of the nozzle 320 or end opening 310. In the absence of the fiber 50, the air jets 262J converge at the central axis CA.

Figure 11A:
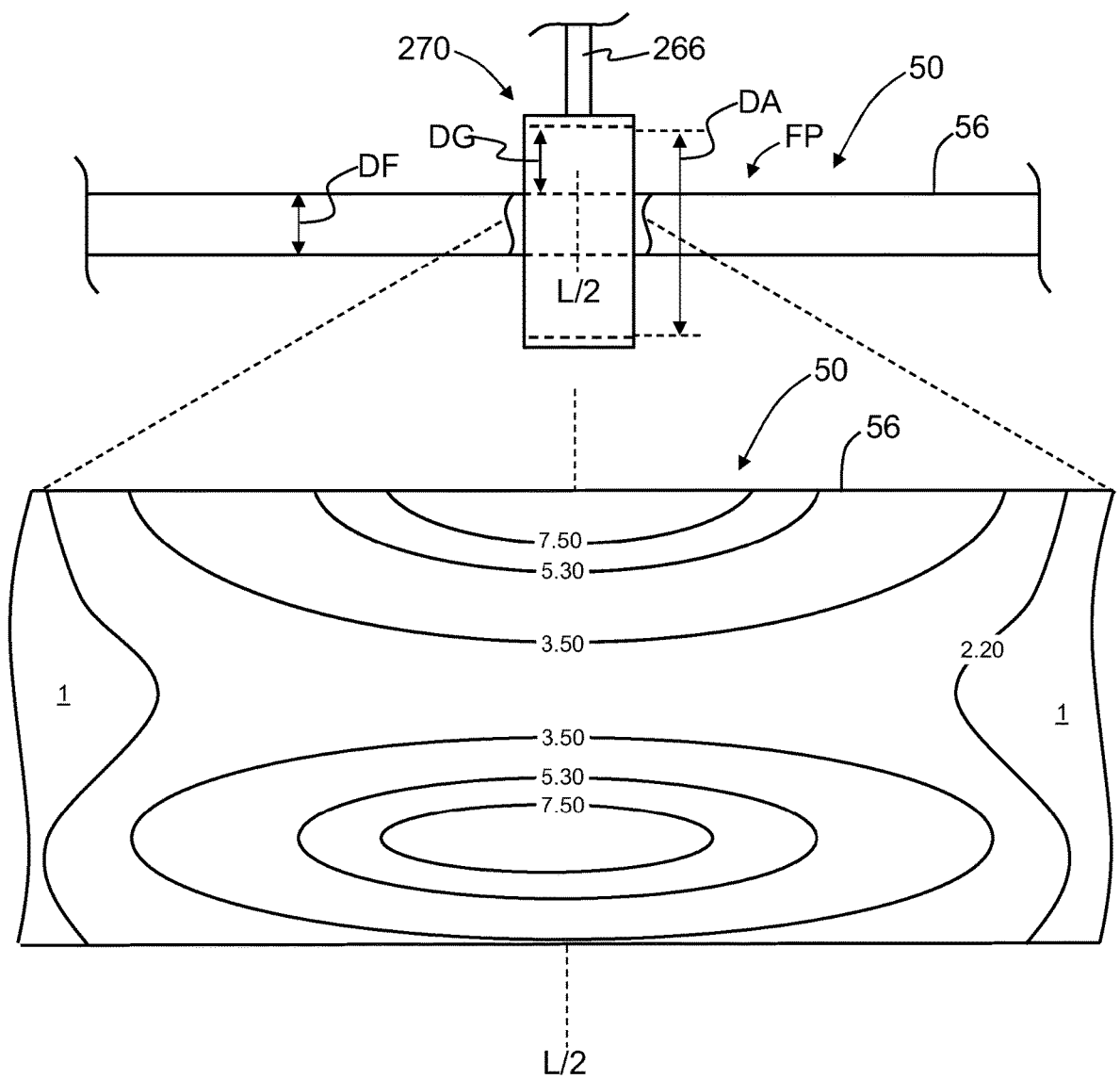
FIGS. 11A and 11B are schematic diagrams that illustrates fluid dynamic modeling results for two example four-nozzle air bearings such as shown in FIGS. 9A and 9B, showing equi-pressure contours of the gauge pressure in the vicinity of the mid-span location where the air bearing is located, and illustrating how the maximum pressure depends on the gap size.
Figure 11B:
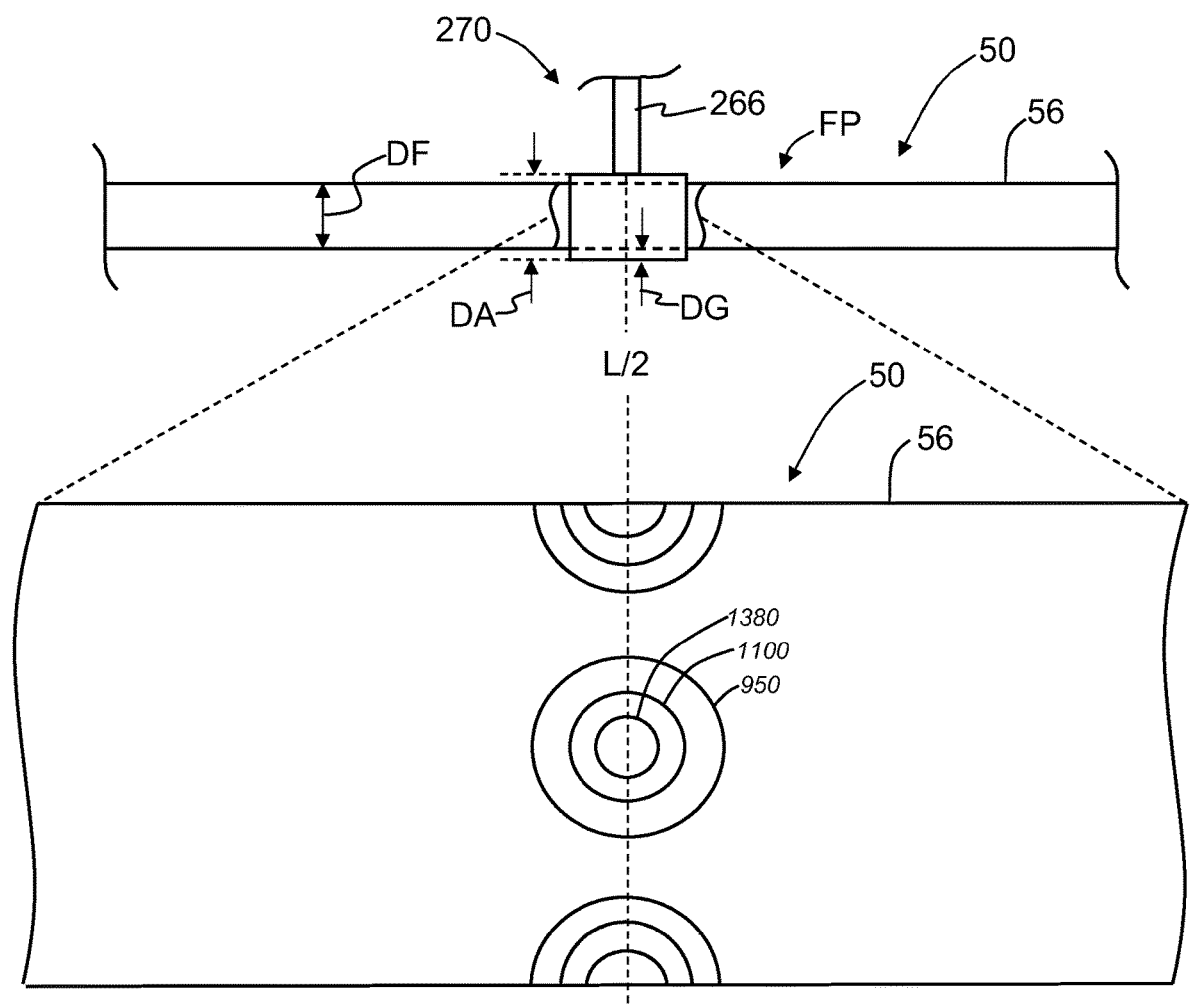

FIGS. 11A and 11B are schematic diagrams illustrating how the stiffness of the air bearing 270 such as shown in FIGS. 9A and 9B can be evaluated using fluid dynamic analysis. Fluid dynamic analysis was performed for the air jets 262J having an air velocity of 10 m/s exiting each of the four nozzles 320.

In FIG. 11A, the diameter DA of the aperture 280 was set at 500 microns while the fiber diameter DF was 250 microns, leaving a gap size DG for the gap G of 125 microns. In FIG. 11B, the diameter DA of the aperture 280 was set at 150 microns while the fiber diameter DF was 125 microns, leaving a gap size DG for the gap G of 25 microns.

The close-up insets of FIGS. 11A and 11B show contours of the gauge pressure (in units of Pa) in the vicinity of the mid-span location of the fiber 50. The gauge pressure is the amount of pressure above atmospheric pressure, i.e., the atmospheric pressure has been subtracted from the total pressure measurement. The maximum (gauge) pressure values $P_{MAX}$ occur as expected at the location on the fiber outer surface 56 at which the given nozzle 320 is pointed and where the air jets 262J directly impinge, and tapers off with distance away from the maximum. Note that the example of FIG. 11A having a gap size DG of 125 microns has a much lower maximum pressure $P_{MAX}$ than the example of FIG. 11B having gap size DG of 25 microns. This reflects the strong dependency of gap size DG on the maximum pressure $P_{MAX}$. This dependency is discussed in greater detail below.

Positioning the Vibration Dampers Based on Vibrational Mode Analysis

As explained above, one or more of the vibration dampers 250 can be placed along the fiber path FP to reduce the amount of lateral fiber vibration at the marking location ML to reduce or eliminate marking errors on the fiber 50.

In addition to the placement of the vibration dampers 250, the amount of damping force or "stiffness" k applied to the fiber 50 by the pressurized air 262 as the fiber passes through the aperture 280 also influences the overall amount of fiber vibration damping.

Figure 12A:
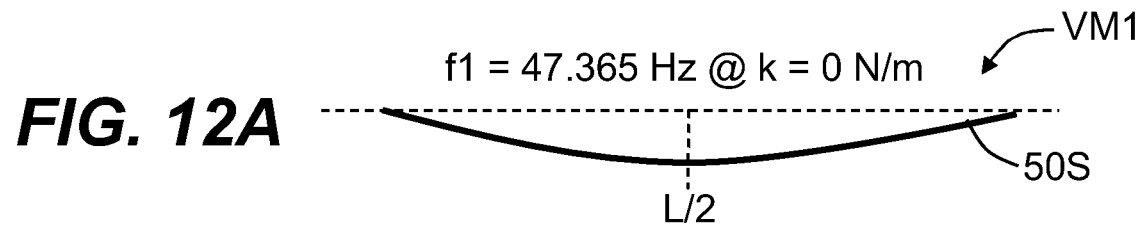
FIGS. 12A through 12F are similar to FIGS. 5A through 5F and illustrate example damping effects on the first (fundamental) vibrational mode for different air bearing stiffnesses (k).
Figure 12B:
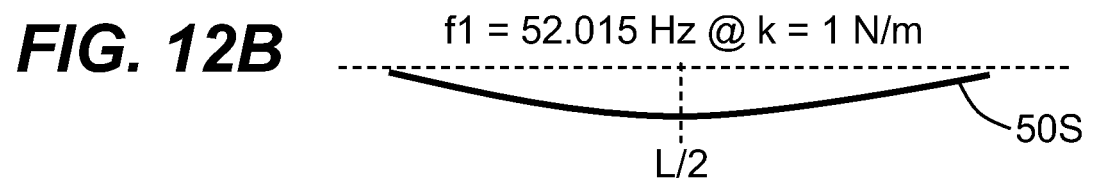
Figure 12C:
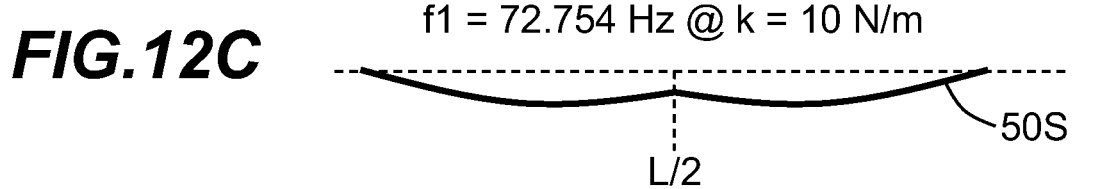
Figure 12D:
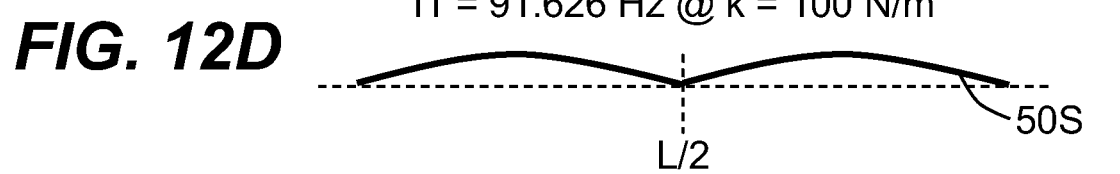
Figure 12E:
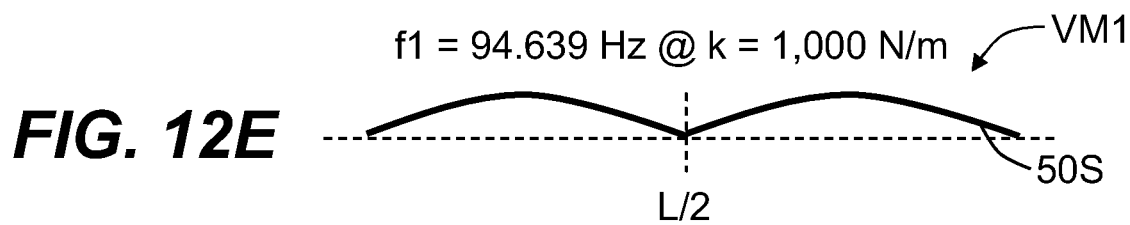
Figure 12F:
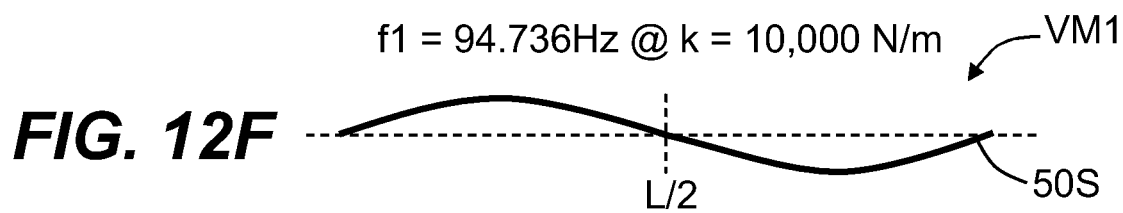
Figure 13A:
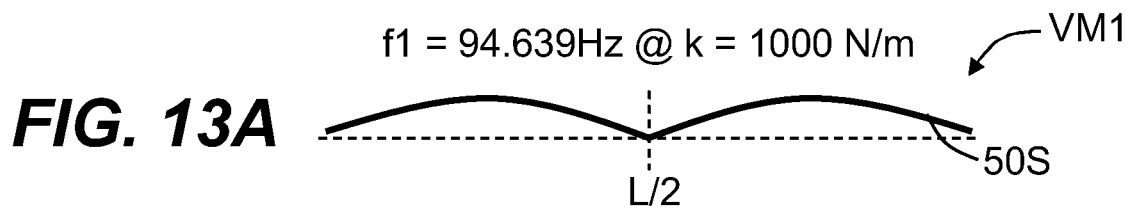
FIGS. 13A through 13F are similar to FIGS. 5A through 5F and illustrate example damping effects on the first six vibrational modes for an air bearing stiffness of k=1000 Newtons/meter.
Figure 13B:
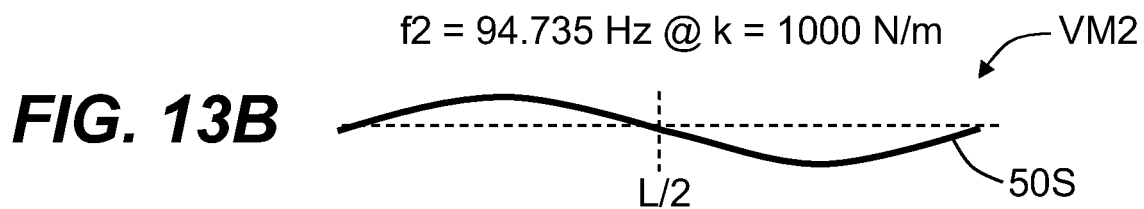
Figure 13C:
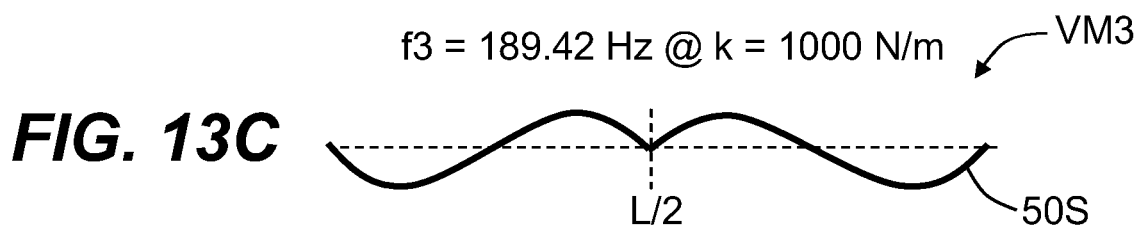
Figure 13D:
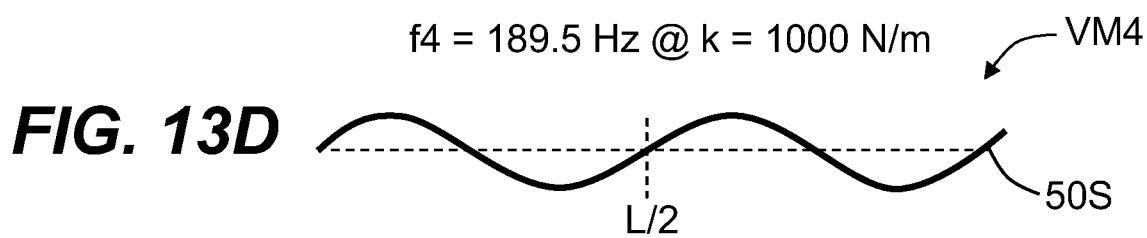
Figure 13E:
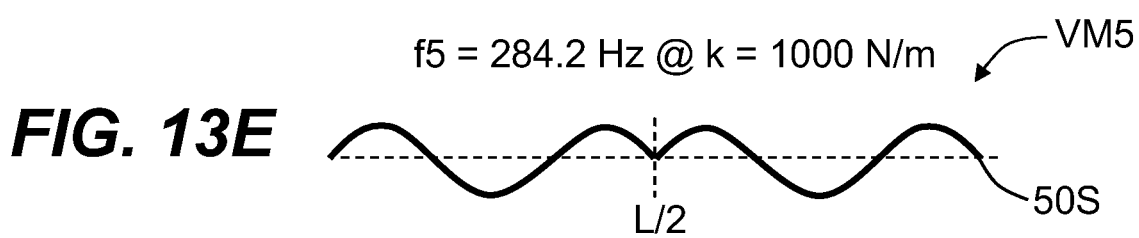
Figure 13F:
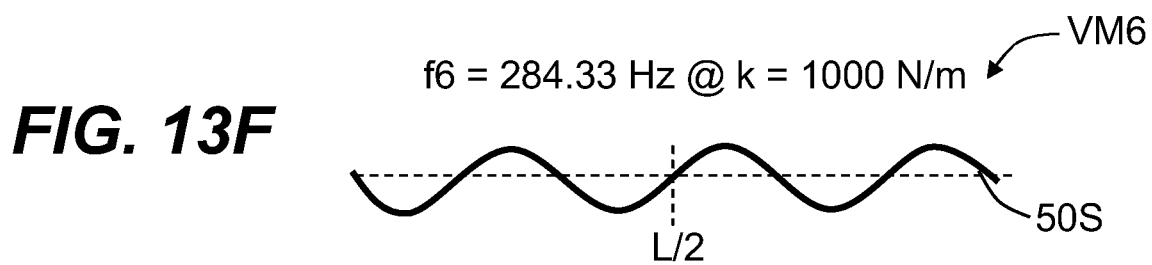

FIGS. 12A through 12F are plots of the simulated fundamental vibrational mode VM1 for a vibration damper 250 disposed at the mid-span location L/2 of the configuration of the fiber 50 shown in FIGS. 4A and 4B, wherein the stiffness k (Newtons/meter or N/m) was varied from k=0 N/m (FIG. 12A, no damping) to k=10,000 N/m (FIG. 12F, large damping). The stiffness k is varied in the air bearing 270 by varying the force of the pressurized air 262 incident upon the outer surface 56 of the fiber 50 as it passes through the aperture 280. The plots shown that a small lateral stiffness k of 1 N/m (FIG. 12B) can increase the fundamental frequency f1 by approximately 10% of its undamped frequency and have a notable effect on reducing the relative lateral displacement at the mid-span location L/2. The changes are more prominent when a slightly larger stiffness of k=10 N/m is adopted (FIG. 12C) and the mid-span displacement tends to be zero when large air stiffness is used, such as shown in FIGS. 12D, 12E and 12F, which are for stiffness values of k=100 N/m, 1,000 N/m and 10,000 N/m, respectively.

FIGS. 13A through 13F are similar to FIGS. 12A through 12F and show the six vibrational modes VM1 through VM6 (shown without damping in FIGS. 5A-5F) with a fixed stiffness of k=1000 N/m, wherein the natural frequencies of the VM1, VM3 and VM5 modes have been tuned by the vibration damper 250 such that they are equal to the vibrational modes VM2, VM4 and VM6, respectively. The plots show that not just the fundamental vibrational mode VM1 can be damped to substantially zero at the mid-span location L/2, but the vibrational modes VM2 through VM6 can also be so damped as well so that they have a relatively small contribution to the overall lateral vibration, i.e., the overall lateral (z-direction) displacement.

If enough vibration dampers 250 with high stiffnesses are placed along the section of fiber 50 surrounding the marking unit 100, the lateral vibration can in principle be eliminated. While generally a desirable outcome, this approach may be impractical and costly, and may not be necessary since the amount of lateral vibration need only be reduced to the point where marking imperfections are eliminated or minimized to within a process specification. In an example, this requires reducing the amount of lateral vibration from say 50 microns peak-to-peak or greater to less than 30 microns peak-to-peak, or more preferably less than 20 microns peak-to-peak.

Vibrational mode analysis can be used to estimate the total dynamic response of the fiber section 50S by summing the contributions from each vibration mode VM1, VM2, etc. Since each vibrational mode has an independent contribution to the total response (vibration), the total amount of vibration can be substantially reduced by reducing (damping) those vibrational modes that have the greatest contribution.

Figure 14:
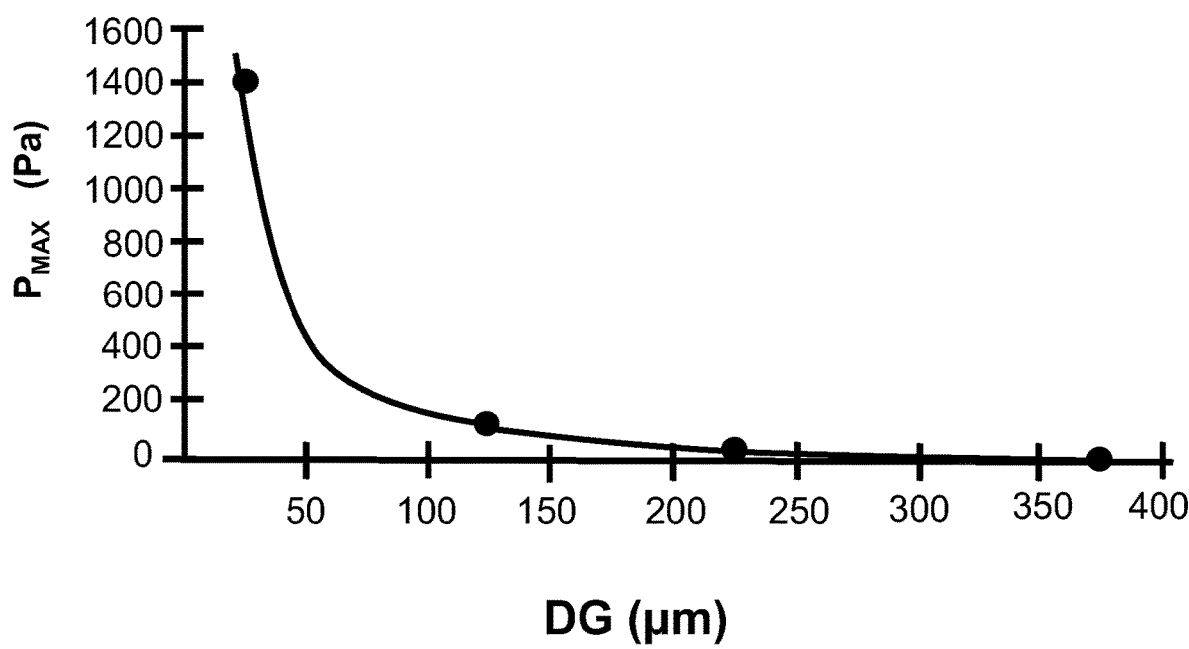
FIG. 14 is a plot of the maximum pressure $P_{MAX}$ (Pa) of the pressurized air from the air jet at the outer surface of the optical fiber versus the gap size DG (μm) for an example air bearing, showing a strong (exponential) drop-off in the maximum pressure with increasing gap size.

A design parameter that can be used to provide a select amount of stiffness for the air bearing 270 is the size DG of the gap G between the inner surface 274 of the air bearing 270 and the fiber outer surface 56 (see, e.g., FIGS. 8A, 8B and 10D). Increasing the gap size DG reduces the amount of pressure on the outer surface 56 of the fiber 50 from the air jets 262J, which reduces the stiffness of the air bearing 270 and thus lessens the damping effect. FIG. 14 is a plot of the maximum pressure $P_{MAX}$ (Pa) of the pressurized air 262 from a single air jet 262J at the outer surface 56 of the fiber 50 from the air jets 262J versus the gap size DG (µm) for the air bearing 270. In generating the data for FIG. 14, the outer diameter of fiber 50 was 125 µm, the nozzle diameter was 62.5 microns and the air velocity was 10 m/s. The solid line represents an example fit through the four data points.

The plot of FIG. 14 shows that the gap size DG can be in the range close to 0 up to about 250 µm to provide adequate stiffness for the air bearing 270. On the low end, the gap size DG is only limited by practical considerations, such as ensuring that the gap size is large enough to prevent the fiber 50 from contacting the inner surface 274 of the air bearing as the fiber moves over the fiber path FP during normal operation of the given optical fiber processing system. In principle, the gap size DG can be nearly 0, and in practice can be as small as just a few microns or 5 microns, depending on the accuracy of the alignment of the air bearing 270 with the fiber 10. Such small gap sizes DG will not typically be necessary since larger gap sizes can provide adequate vibration damping for most optical fiber processing systems while also providing some relief on the alignment tolerance of the air bearing 270 relative to the fiber path FP. Thus, in an example, the upper limit on the range of the gap size DG can be from 150 microns to 250 microns while the lower limit on the range of the gap size can be anywhere from 3 microns to 25 microns. The gap size DG will depend on the given application, including the amount of peak-to-peak vibration of the fiber 10 and the nature and operational parameters (e.g., fiber speed) of the given optical fiber processing system.

Variations in air velocity and/or gap size DG provide values of maximum pressure $P_{MAX}$ that vary over a wide range. In embodiments, the air bearing 270 is configured to provide $P_{MAX}$ (in units of gauge pressure) in the range from 1 Pa-50,000 Pa, or in the range from 3 Pa-30,000 Pa, or in the range from 5 Pa-20,000 Pa, or in the range from 10 Pa-10,000 Pa, or in the range from 50 Pa-7,500 Pa, or in the range from 100 Pa-5,000 Pa, or greater than 1 Pa, or greater than 10 Pa, or greater than 100 Pa, or greater than 1000 Pa, or greater than 5000 Pa.

It is noted that a symmetrical arrangement of nozzles 320 and/or openings 310 about the center CC of the aperture 280 provides a self-alignment mechanism for the fiber 50 since an offset from the center will result in an asymmetrical force that pushes the fiber back to the center. Likewise, the farther off-center the fiber 50, the larger the restoring force from the air jets 262J on the fiber to return the fiber to the center CC. Thus, as the fiber 50 vibrates and is displaced from the center CC of the aperture 280, the gap size DG of the gap G between the outer surface 56 of the fiber 50 and the air jets 262J changes. Vibration causes the fiber 50 to move closer to some of the air jets 262J and farther from others of the air jets 262J. As the fiber 50 moves closer to an air jet 262J, the maximum pressure $P_{MAX}$ exerted by that air jet 262 on fiber 50 increases to create greater resistance to further displacement toward that air jet 262 and a tendency to drive the fiber 50 back toward the center CC of aperture 280 to dampen the vibration. Conversely, as vibration displaces the fiber 50 farther away from certain of the air jets 262, the pressure $P_{MAX}$ exerted those air jets 262J on the fiber 50 decreases. The net result is an increase in $P_{MAX}$ from those of air jets 262J toward which fiber 50 is vibrationally displaced and a decrease in $P_{MAX}$ from those of air jets 262J from which fiber 50 is vibrationally displaced. The imbalance in $P_{MAX}$ from the different directions provides a restoring force that acts to damp the vibration and return the optical fiber 50 toward the center CC of aperture 280. The position of fiber 50 with respect to marking location ML is accordingly stabilized.

In examples, apparatus 10 and one or more vibration dampers 250 operate to keep the peak-to-peak displacement of the fiber 50 at the marking location ML to be less than 40 µm, or more preferably less than 30 µm, or even more preferably less than 20 µm, or even more preferably less than 10 µm. The position sensor 120 sends displacement measurement information to the controller 400, which monitors the vibration data and either terminates the marking process or generates a warning signal (or both) if the z-displacement measurements exceed the z-displacement tolerance δz.

Aspect 1 of the description is:
An apparatus for damping vibration of a vibrating optical fiber moving over an optical fiber path, comprising:
   a) an air bearing comprising:
     a body having an aperture defined by an inner surface of the body;
     a central axis that passes through the center of the aperture and along which lies the optical fiber path;
     a plurality of nozzles distributed around the inner surface and directed toward the central axis;
     an air conduit within the body and that is in pneumatic communication with the plurality of nozzles; and
   b) an air supply pneumatically connected to the air conduit and configured to supply pressurized air to the air bearing, wherein the pressurized air is directed through the nozzles to the vibrating optical fiber to damp the vibration of the vibrating optical fiber.

Aspect 2 of the description is:
The apparatus according to Aspect 1, wherein the vibrating optical fiber has a section extending from a first support location to a second support location along the optical fiber path, the section having a mid-span location, and wherein the air bearing is disposed substantially at the mid-span location.

Aspect 3 of the description is:
The apparatus according to Aspect 1 or 2, wherein each of the nozzles comprises an end opening that is substantially flush with the inner surface of the body of the air bearing.

Aspect 4 of the description is:
The apparatus according to any of Aspects 1-3, wherein the vibrating optical fiber has an outer surface and wherein the inner surface of the air bearing and the outer surface of the vibrating optical fiber define a gap G with a gap dimension DG that has a range with an upper limit that can be between 150 microns and 250 microns and a lower limit that can be between 3 microns to 25 microns.

Aspect 5 of the description is:
The apparatus according to any of Aspects 1-4, wherein the vibrating optical fiber has an outer surface and wherein each nozzle provides at the outer surface a maximum amount of air pressure $P_{MAX}$ (in units of gauge pressure) in the range from 10 Pa-10,000 Pa.

Aspect 6 of the description is:
The apparatus according to any of Aspects 1-5, wherein the pressurized air directed through the nozzles to the vibrating optical fiber defines a stiffness k in the range from 1 N/m to 10,000 N/m that acts to damp vibration of the vibrating optical fiber.

Aspect 7 of the description is:
The apparatus according to any of Aspects 1-6, wherein the plurality of nozzles comprises between four and 32 nozzles distributed over the inner surface.

Aspect 8 of the description is:
The apparatus according to any of Aspects 1-7, wherein the optical fiber moves over the optical fiber path at a fiber speed of between 3 meters/second and 25 meters/second.

Aspect 9 of the description is:
The apparatus according to any of Aspects 1-8, wherein the pressurized air is effective to damp the vibration of the vibrating optical fiber to a peak-to-peak displacement less than 30 microns.

Aspect 10 of the description is:
The apparatus according to any of Aspects 1-8, wherein the pressurized air is effective to damp the vibration of the vibrating optical fiber to a peak-to-peak displacement less than 20 microns.

Aspect 11 of the description is:
An optical fiber processing apparatus, further comprising:
  the apparatus of any of Aspects 1-10; and
  a marking unit positioned along the optical fiber path, the marking unit configured to dispense a marking material to form marks on an outer surface of the vibrating optical fiber at a marking location.

Aspect 12 of the description is:
The optical fiber processing apparatus of Aspect 11, wherein the optical fiber moves over the optical fiber path at a fiber speed greater than 3 meters/second, and wherein the pressurized air is effective to damp the vibration of the vibrating optical fiber to a peak-to-peak displacement less than 30 microns at the marking location.

Aspect 13 of the description is:
A method of marking an optical fiber having an outer surface, comprising:
  moving the optical fiber past a marking unit, wherein the moving optical fiber has an amount of undamped vibration;
  dispensing marking material to the outer surface of the optical fiber to form at least one mark on the outer surface; and
  damping the undamped vibration of the moving optical fiber without physically contacting the optical fiber to define an amount of damped vibration of the moving optical fiber that is less than the undamped vibration and that is within a select fiber vibration tolerance.

Aspect 14 of the description is:
The method according to Aspect 13, wherein the marking material is ink and the act of dispensing is performed using an ink-jet printer head.

Aspect 15 of the description is:
The method according to Aspect 13 or 14, wherein the act of damping the undamped vibration of the moving optical fiber without physically contacting the optical fiber comprises directing a plurality of air jets at the outer surface of the optical fiber.

Aspect 16 of the description is:
The method according to Aspect 15, further comprising forming the air jets by directing pressurized air through a plurality of nozzles operably supported by an air bearing having an aperture through which the optical fiber passes, wherein the nozzles are distributed over an inner surface that defines the aperture.

Aspect 17 of the description is:
The method according to Aspect 16, wherein the optical fiber has a mid-span location, and wherein the air bearing is disposed substantially at the mid-span location.

Aspect 18 of the description is:
The method according to Aspect 16 or 17, wherein the inner surface of the air bearing and the outer surface of the optical fiber define a gap G with a gap dimension DG having a range with an upper limit that can be between 150 microns and 250 microns and a lower limit that can be between 3 microns to 25 microns.

Aspect 19 of the description is:
The method according to any of Aspects 15-18, wherein each air jets provides at the outer surface of the optical fiber a maximum amount of air pressure $P_{MAX}$ in the range from 10 Pa to 10,000 Pa.

Aspect 20 of the description is:
The method according to any of Aspects 15-19, wherein the air jets define a stiffness k in the range from 1 N/m to 10,000 N/m.

Aspect 21 of the description is:
The method according to any of Aspects 13-20, wherein the undamped fiber vibration is in excess of 40 microns peak-to-peak, and wherein the amount of damped vibration is less than 30 microns peak-to-peak.

Aspect 22 of the description is:
The method according to any of Aspects 13-20, wherein the undamped fiber vibration is in excess of 40 microns peak-to-peak, and wherein the amount of damped vibration is less than 20 microns peak-to-peak.

Aspect 23 of the description is:
The method according to any of Aspects 13-22, wherein the moving optical fiber has a fiber speed that is between 3 meters/second and 25 meters per second.

Aspect 24 of the description is:
A method of processing a vibrating optical fiber, comprising:
  moving the vibrating optical fiber along an optical fiber path at a line speed greater than 3 m/s; and
  directing pressurized air to the optical fiber, the pressurized air having a maximum pressure $P_{MAX}$ sufficient to reduce a peak-to-peak displacement of a vibration of the vibrating optical fiber.

Aspect 25 of the description is:
The method of Aspect 24, wherein the line speed is greater than 10 m/s.

Aspect 26 of the description is:
The method of Aspect 24 or 25, wherein the maximum pressure $P_{MAX}$ (in units of gauge pressure) of the pressurized air is greater than 1 Pa.

Aspect 27 of the description is:
The method of Aspect 24 or 25, wherein the maximum pressure $P_{MAX}$ (in units of gauge pressure) of the pressurized air is greater than 10 Pa.

Aspect 28 of the description is:
The method of Aspect 24 or 25, wherein the maximum pressure $P_{MAX}$ (in units of gauge pressure) of the pressurized air is greater than 100 Pa.

Aspect 29 of the description is:
The method of Aspect 24 or 25, wherein the maximum pressure $P_{MAX}$ (in units of gauge pressure) of the pressurized air is greater than 1000 Pa.

Aspect 30 of the description is:
The method of Aspect 24 or 25, wherein the maximum pressure $P_{MAX}$ (in units of gauge pressure) of the pressurized air is greater than 5000 Pa.

Aspect 31 of the description is:
The method of any of Aspects 24-30, wherein the pressure of the pressurized air is sufficient to reduce the peak-to-peak displacement of the vibration of the vibrating optical fiber from above 40 μm to below 30 μm.

Aspect 32 of the description is:
The method of Aspect 24, wherein the pressure of the pressurized air is sufficient to reduce the peak-to-peak displacement of the vibration of the vibrating optical fiber from above 40 μm to below 20 μm.

Aspect 33 of the description is:
The method of any of Aspects 24-30, wherein the pressure of the pressurized air is sufficient to reduce the peak-to-peak displacement of the vibration of the vibrating optical fiber by at least 10 μm.

Aspect 34 of the description is:
The method of any of Aspects 24-30, wherein the pressure of the pressurized air is sufficient to reduce the peak-to-peak displacement of the vibration of the vibrating optical fiber by at least 20 μm.

Aspect 35 of the description is:
The method of any of Aspects 24-30, wherein the pressure of the pressurized air is sufficient to define a stiffness k in the range from 1 N/m to 10,000 N/m that counteracts the vibration of the vibrating optical fiber Aspect 36 of the description is:
The method of any of Aspects 24-35, further comprising marking the vibrating optical fiber with a marking material.

Aspect 37 of the description is:
The method of any of Aspects 24-36, wherein the pressurized air is directed at a plurality of positions around a circumference of the vibrating optical fiber.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. An apparatus for damping vibration of a vibrating optical fiber moving over an optical fiber path, comprising:
   a) an air bearing comprising:
      a body having an aperture defined by an inner surface of the body;
      a central axis that passes through the center of the aperture and along which lies the optical fiber path;
      a plurality of nozzles distributed around the inner surface and directed toward the central axis;
      an air conduit within the body and that is in pneumatic communication with the plurality of nozzles; and
   b) an air supply pneumatically connected to the air conduit and configured to supply pressurized air to the air bearing, wherein the pressurized air is directed through the nozzles to the vibrating optical fiber to damp the vibration of the vibrating optical fiber, the vibrating optical fiber has an outer surface and each nozzle provides at the outer surface a maximum amount of air pressure $P_{MAX}$ (in units of gauge pressure) in the range from 10 Pa 10,000 Pa.

2. The apparatus according to claim 1, wherein the vibrating optical fiber has a section extending from a first support location to a second support location along the optical fiber path, the section having a mid-span location, and wherein the air bearing is disposed substantially at the mid-span location.

3. The apparatus according to claim 1, wherein each of the nozzles comprises an end opening that is substantially flush with the inner surface of the body of the air bearing.

4. The apparatus according to claim 1, wherein the vibrating optical fiber has an outer surface and wherein the inner surface of the air bearing and the outer surface of the vibrating optical fiber define a gap G with a gap dimension DG that has a range with an upper limit between 150 microns and 250 microns and a lower limit between 3 microns to 25 microns.

5. The apparatus according to claim 1, wherein the optical fiber moves over the optical fiber path at a fiber speed of between 3 meters/second and 25 meters/second.

6. The apparatus according to claim 1, wherein the pressurized air is effective to damp the vibration of the vibrating optical fiber to a peak-to-peak displacement less than 30 microns.

7. An optical fiber processing apparatus, comprising:
   the apparatus of claim 1; and
   a marking unit positioned along the optical fiber path, the marking unit configured to dispense a marking material to form marks on an outer surface of the vibrating optical fiber at a marking location.

8. The optical fiber processing apparatus of claim 7, wherein the optical fiber moves over the optical fiber path at a fiber speed greater than 3 meters/second, and wherein the pressurized air is effective to damp the vibration of the vibrating optical fiber to a peak-to-peak displacement less than 30 microns at the marking location.

9. A method of marking an optical fiber having an outer surface, comprising:
   moving the optical fiber past a marking unit, wherein the moving optical fiber has an amount of undamped vibration;
   dispensing marking material to the outer surface of the optical fiber to form at least one mark on the outer surface; and
   damping the undamped vibration of the moving optical fiber without physically contacting the optical fiber to define an amount of damped vibration of the moving optical fiber that is less than the undamped vibration and that is within a select fiber vibration tolerance;
   wherein the undamped fiber vibration is in excess of 40 microns peak-to-peak and the amount of damped vibration is less than 30 microns peak-to-peak.

10. The method according to claim 9, wherein the act of damping the undamped vibration of the moving optical fiber without physically contacting the optical fiber comprises directing a plurality of air jets at the outer surface of the optical fiber.

11. The method according to claim 10, further comprising forming the air jets by directing pressurized air through a plurality of nozzles operably supported by an air bearing having an aperture through which the optical fiber passes, wherein the nozzles are distributed over an inner surface that defines the aperture.

12. The method according to claim 11, wherein the inner surface of the air bearing and the outer surface of the optical fiber define a gap G with a gap dimension DG having a range with an upper limit between 150 microns and 250 microns and a lower limit between 3 microns to 25 microns.

13. The method according to claim 10, wherein each air jet provides at the outer surface of the optical fiber a maximum amount of air pressure $P_{MAX}$ in the range from 10 Pa to 10,000 Pa.

14. The method according to claim 9, wherein the moving optical fiber has a fiber speed that is between 3 meters/second and 25 meters per second.

15. A method of processing a vibrating optical fiber, comprising:
   moving the vibrating optical fiber along an optical fiber path at a line speed greater than 3 m/s; and
   directing pressurized air to the optical fiber, the pressurized air having a maximum pressure $P_{MAX}$ sufficient to reduce a peak-to-peak displacement of a vibration of the vibrating optical fiber by at least 10 μm.

16. The method of claim 15, wherein the maximum pressure $P_{MAX}$ (in units of gauge pressure) of the pressurized air is greater than 100 Pa.

17. The method of claim 15, further comprising marking the vibrating optical fiber with a marking material.

* * * * *

UNITED STATES PATENT AND TRADEMARK OFFICE
CERTIFICATE OF CORRECTION

PATENT NO. : 11,168,757 B2
APPLICATION NO. : 16/552086
DATED : November 9, 2021
INVENTOR(S) : Li et al.

It is certified that error appears in the above-identified patent and that said Letters Patent is hereby corrected as shown below:

In the Claims

In Column 17, Line 64, Claim 1, delete "10 Pa 10,000 Pa." and insert -- 10 Pa-10,000 Pa. --, therefor.

Signed and Sealed this
Tenth Day of May, 2022

Katherine Kelly Vidal
*Director of the United States Patent and Trademark Office*